United States Patent [19]

Wollermann et al.

[11] Patent Number: 4,819,533

[45] Date of Patent: Apr. 11, 1989

[54] WIRE PROCESSING APPARATUS HAVING PUSHBAR AND CONVEYOR MECHANISMS

[75] Inventors: Kenneth Wollermann, Mukwonago; Ragnar Gudmestad, Wauwatosa; Terry R. Kroening, Cedarburg; John E. Conrardy, Jackson, all of Wis.

[73] Assignee: Artos Engineering Company, New Berlin, Wis.

[21] Appl. No.: 84,688

[22] Filed: Aug. 11, 1987

[51] Int. Cl.$^4$ .................... B26D 7/06; B65G 15/14
[52] U.S. Cl. ........................ 83/154; 83/151; 83/155; 83/373; 198/626; 198/627
[58] Field of Search ............. 83/71, 151, 155, 154, 83/373, 69; 198/626, 627

[56] References Cited

U.S. PATENT DOCUMENTS

| | | | |
|---|---|---|---|
| 2,823,747 | 2/1958 | Rehberg | 83/154 X |
| 3,927,590 | 12/1975 | Gudmestad et al. | 83/151 |
| 4,164,808 | 8/1979 | Gudmestad et al. | 83/151 X |
| 4,165,768 | 8/1979 | Gudmestad | 83/151 |
| 4,166,315 | 9/1979 | Gudmestad et al. | 83/151 X |
| 4,175,316 | 11/1979 | Gudmestad | 83/151 X |
| 4,493,233 | 1/1985 | Dusel et al. | 83/71 |
| 4,672,871 | 6/1987 | Gudmestad | 83/151 |

FOREIGN PATENT DOCUMENTS 2101951  1/1983  United Kingdom ............... 198/627

*Primary Examiner*—William L. Sikes
*Assistant Examiner*—Brian M. Healy
*Attorney, Agent, or Firm*—James E. Nilles; Thomas F. Kirby

[57] ABSTRACT

Wire processing apparatus comprises a wire selector/feed mechanism for feeding a selected one of a plurality of different wire strands lengthwise into a wire insertion mechanism which then presents a wire segment severed by a wire cutter mechanism laterally to the infeed ends of a pair of laterally spaced apart conveyor units of a conveyor mechanism. Each conveyor unit comprises a support frame on which a conveyor belt assembly is mounted. The conveyor belt assembly is adjustably positionable on the support frame to enable wire segment end portions of desired length to project from the conveyor belt assembly. The wire selector/feed mechanism comprises a wire selector device including a pair of spaced apart rotatable plates having pairs of aligned holes for releasably supporting the wire strands. The wire selector/feed mechanism further comprises a wire feed device located between the plates which receives and feeds a selected strand to a passage in the wire insertion mechanism defined by a pair of elongated resilient blades. Two (inboard and outboard) pushbars in the wire insertion mechanism, each independently operable by a separate pushbar actuator acting through a mechanical linkage, extend and retract to laterally move wire in the passage into the conveyor mechanism. The inboard pushbar also operates the wire cutter mechanism. The outboard pushbar actuator also operates a blade separator member. The pushbar actuator can operate in different modes to provide standard-length or extra-long wire segments.

16 Claims, 16 Drawing Sheets

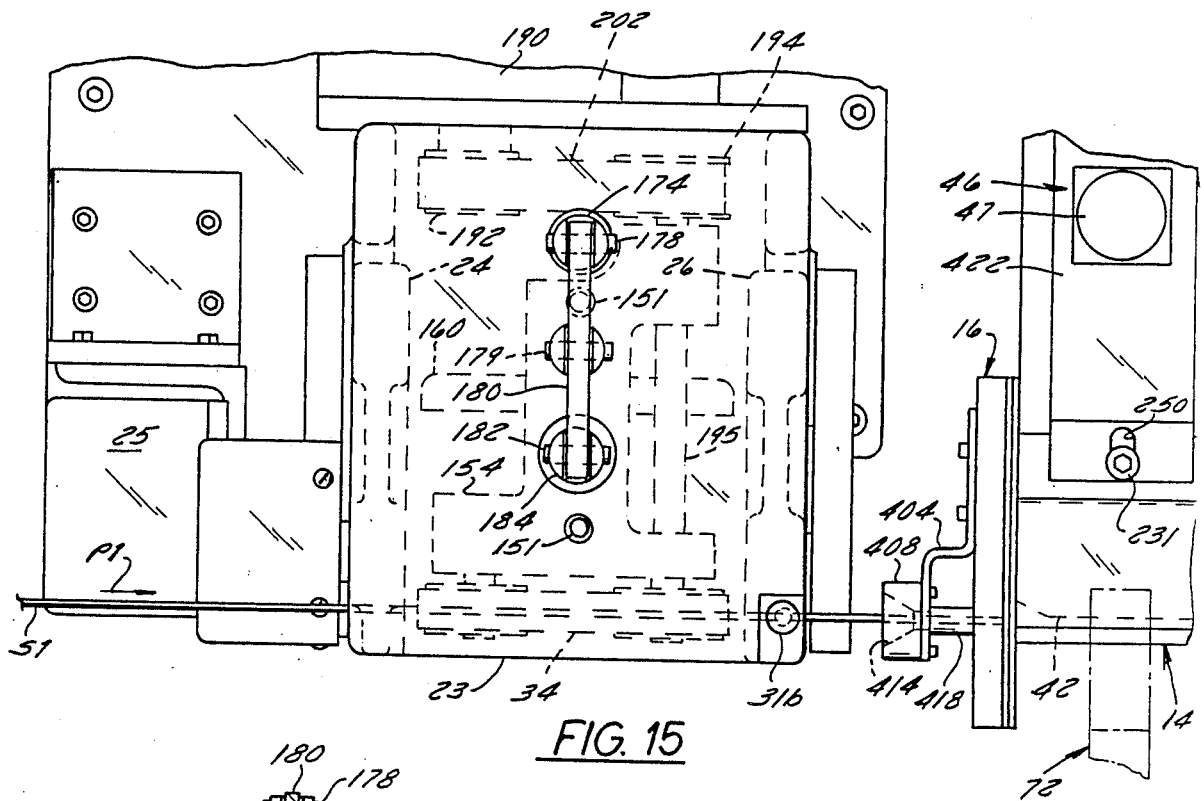
FIG. 15
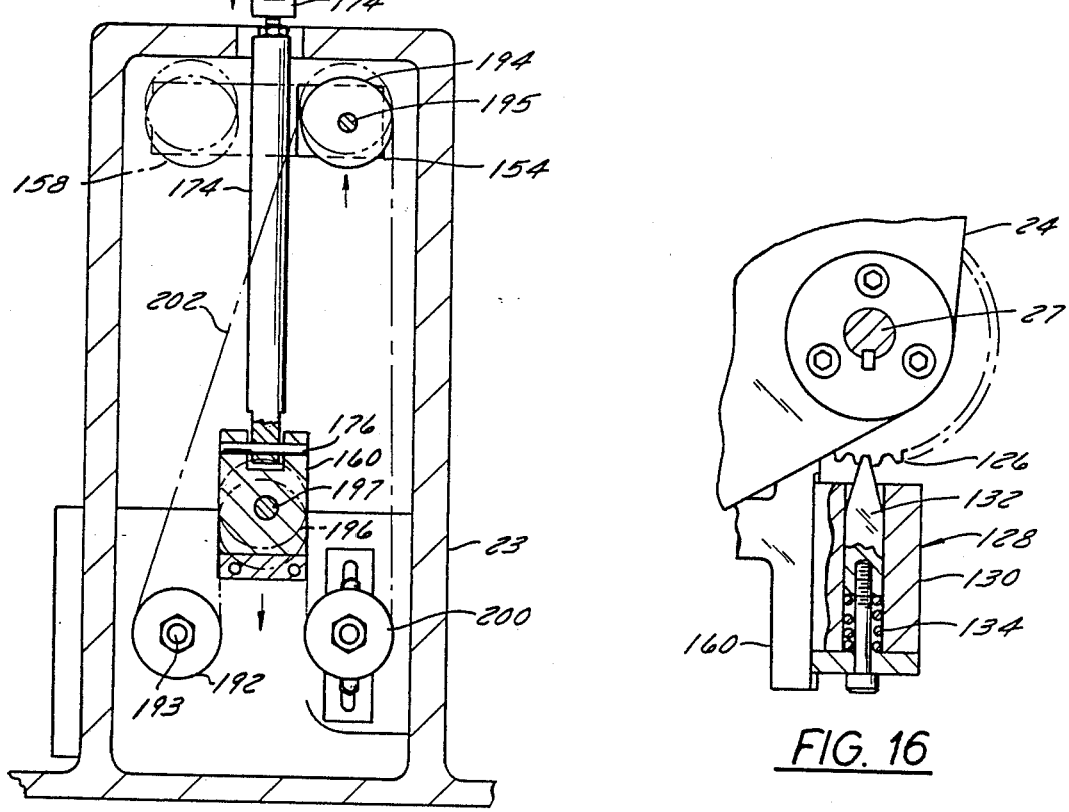
FIG. 17
FIG. 16

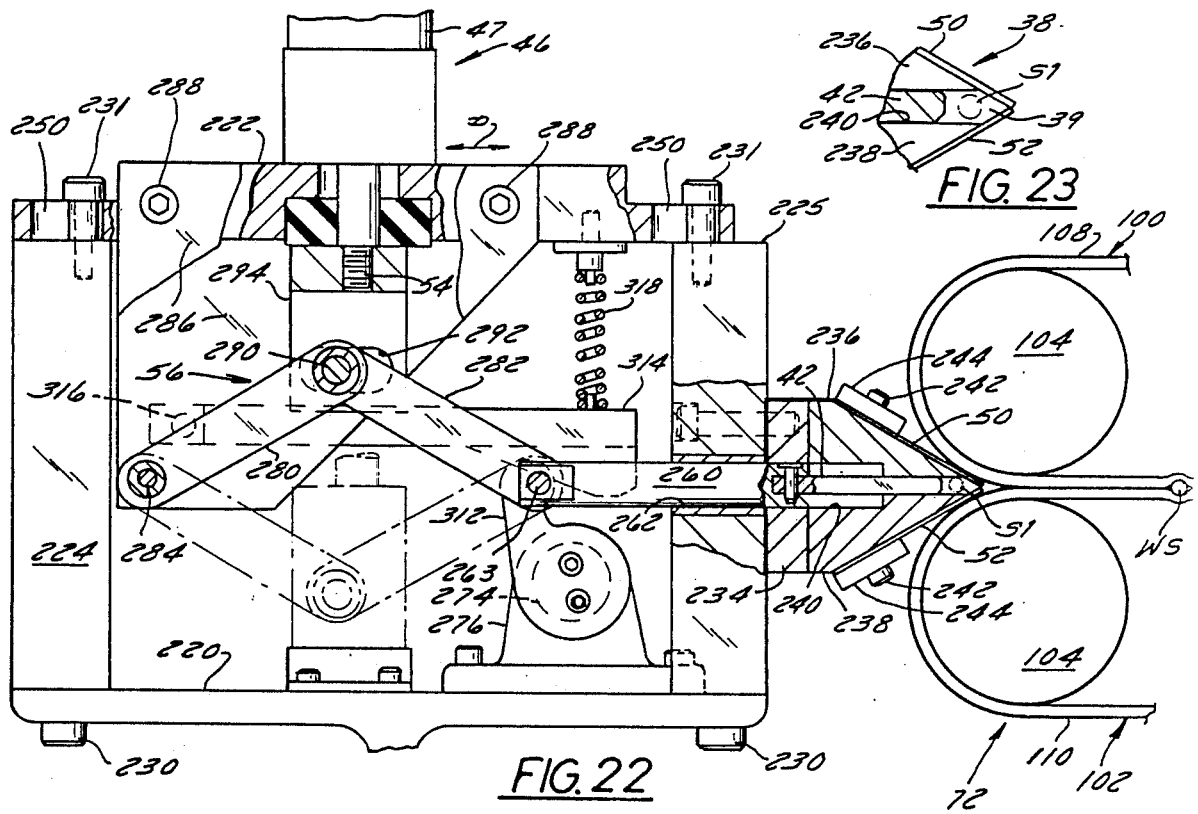
FIG. 23
FIG. 22
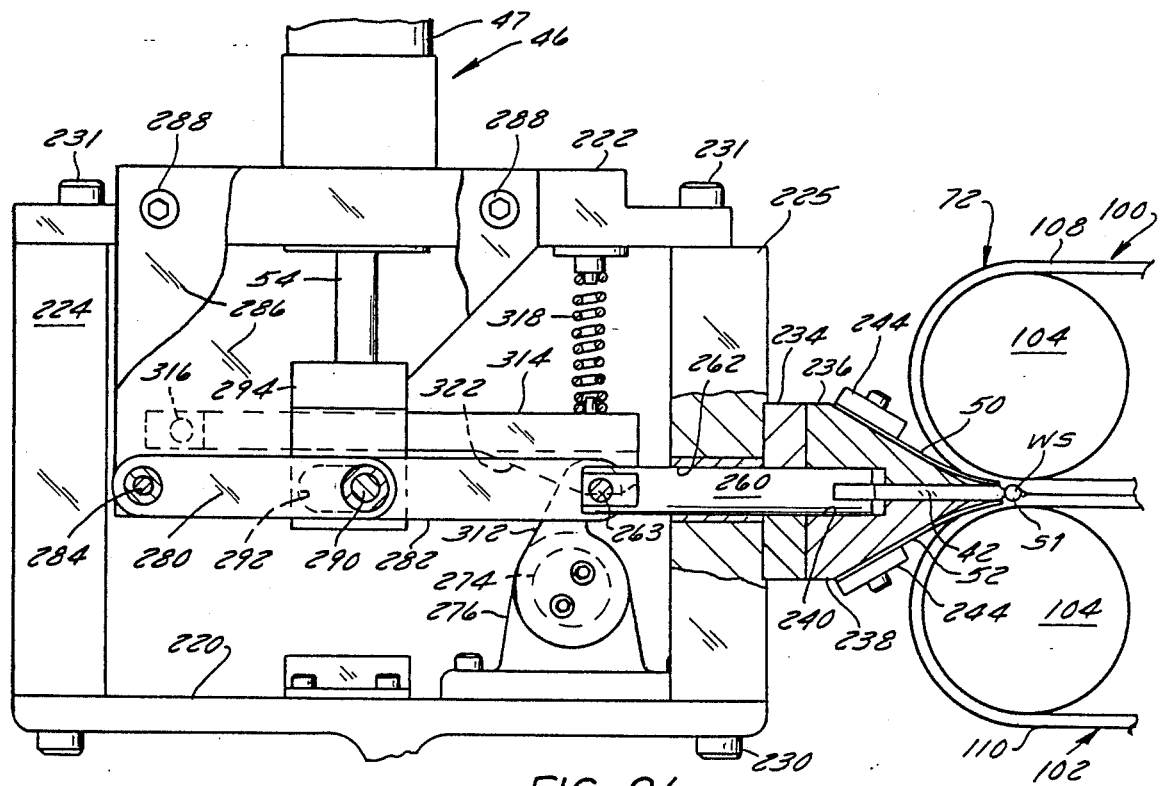
FIG. 24

WIRE PROCESSING APPARATUS HAVING PUSHBAR AND CONVEYOR MECHANISMS

BACKGROUND OF THE INVENTION

1. Field of Use

This invention relates generally to wire processing apparatus and particularly to improved mechanisms in such apparatus, including a conveyor mechanism, a wire selector/feed mechanism, a wire insertion mechanism and a wire cutter mechanism.

2. Description of the Prior Art

Various types of wire processing apparatus are known and in use.

In some prior art apparatus, the conveyor mechanism comprises two laterally spaced apart conveyor units, one stationary and the other adjustably positionable relative thereto, to accommodate wire segments of different length which are transported past machines which strip and terminate the wire segment ends which project outwardly from the sides of wire gripping means in the conveyor assemblies in the conveyor units. Typically, however, the length of the projecting portion of the wire segment cannot easily be varied or adjusted to accommodate different types or sizes of stripping and terminating machines.

In some prior art apparatus, a wire selector mechanism is provided to select one of a plurality of different wire strands supplied from wire reels and from which a wire segment is to be cut. Typically, however, prior art wire selector mechanisms employ a complex and costly arrangement of several pneumatic actuators requiring complex controls.

In some prior art apparatus, a selected wire strand is fed endwise into an elongated passage in an elongated wire insertion mechanism. A wire segment of desired length is then cut from the strand and pushed laterally from between two elongated resilient blades defining the passage by means of one or more pushbars into the infeed ends of a pair of laterally spaced apart flexible belt type conveyor units. Typically, the pushbar is moved from retracted to extended position and back again by a motor-driven rotary cam, but this requires an elaborate and expensive electronic motor control and braking means to precisely position the motor, cam and pushbar. Furthermore, the latter type of apparatus, a wire cutter mechanism is located at the infeed end of the wire insertion mechanism but is operated independently of the motor driven cam by a separate drive mechanism, thereby adding to the cost and complexity of the apparatus.

While the aforedescribed prior art mechanisms are generally satisfactory for their intended purposes, it is desirable to provide improved wire processing apparatus having improved mechanisms therein which avoid or overcome the aforementioned problems or drawbacks, which are more economical to manufacture and service, which are very reliable in use, and which offer more versatility in operation and use.

SUMMARY OF THE PRESENT INVENTION

Wire processing apparatus in accordance with the present invention comprises improved mechanisms, including a conveyor mechanism, a wire selector/feed mechanism, a wire insertion mechanism and a wire cutter mechanism, which mechanisms are generally arranged and operate as follows.

The conveyor mechanism, which has an infeed end and a discharge end, comprises a pair of laterally spaced apart flexible belt type conveyor units, including a stationary inboard conveyor unit and an adjustably movable outboard conveyor unit, and each conveyor unit comprises a wire conveyor assembly. The wire insertion mechanism extends longitudinally across the infeed end of the conveyor mechanism and includes an elongated wire-receiving passage with a wire strand infeed opening near the infeed end of the inboard conveyor unit. The wire selector/feed mechanism is located adjacent the infeed end of the wire insertion mechanism. The wire cutter mechanism is located between the wire selector/feed mechanism and the infeed opening and is operated by the wire insertion mechanism.

The wire selector/feed mechanism, which is supplied with a plurality of different wire strands from several wire reels, selects a desired strand and feeds it along a first path through the infeed and into the passage of the wire insertion mechanism. The wire insertion mechanism comprises movable pushbars which laterally expel a wire segment cut from the selected strand by the cutter mechanism and forces it into the infeed ends of the conveyor assemblies for conveyance thereby along a second path which is transverse (perpendicular) to the first path. The wire segment is disposed transverse (perpendicular) to the second path so that end portions of the wire segment which project outwardly from the sides of the conveyor assemblies can be stripped and terminated by machines mounted on the respective conveyor units.

The wire selector/feed mechanism comprises a wire selector device and a wire feed device. The wire selector device comprises two axially spaced apart (outboard and inboard) rotatably movable plates between which the wire feed device is mounted. Each plate has a series of holes arranged in an arc along its peripheral edge and each pair of aligned holes in the two plates accommodates the free end of a wire strand which is releasably secured against accidental withdrawal. The wire feed device comprises a pair of rotatable separable wire feed belts disposed opposite each other above and below the first path. The belts are separated to receive a selected wire strand moved therebetween by rotation of the two plates, then close to grip and propel the selected wire strand (after it is released) along the first path and into the infeed opening of the passage in the wire insertion mechanism.

The wire insertion mechanism comprises an elongated wire guide which defines the wire-receiving passage, two (inboard and outboard) pushbars for laterally expelling a wire segment therefrom and into the conveyor assemblies, and a pair of (inboard and outboard) independently operable pushbar actuators for extending and retracting the pushbars. The wire guide comprises two elongated resilient blades disposed above, below and parallel to the first path which are normally closed but are resiliently movable to open position by the pushbars. Each pushbar is independently movable by its actuator to an extended position wherein it forces an adjacent length of wire laterally outwardly from the passage, out between the resilient blades (which are temporarily opened) into the infeed end of an associated conveyor assembly. Each pushbar actuator has an extendable/retractable piston rod connected by a mechanical linkage to its associated pushbar. Each extension or retraction stroke of the piston rod effects a complete cycle of operation of the associated pushbar segment, i.e., extension and retraction. The retracted position of the pushbars is adjustable to change the size of the passage so as to accommodate wire strands of different diameters.

The inboard pushbar actuator also operates the wire cutting mechanism. The outboard pushbar actuator also operates a retractable/extendable separator member which is located between the two pushbars and is extendable to separate a portion of the resilient blades during certain operations.

The wire cutter mechanism comprises a stationary housing mounted on inboard end of the support frame of the wire insertion mechanism. Two cutter blade holders are slidably mounted within the housing and both are reciprocally movable by the inboard pushbar from a starting (retracted) position, to a cutting (extended) position and back to the starting (retracted) position. Each cutter blade holder carries a multi-edged cutter blade. The housing and both cutter blade holders each have a hole through which the selected wire strand extends. Initial movement of one cutter blade holder shifts the unsevered wire strand laterally forward of the first path prior to cutting to prevent bending. However, the other cutter blade holder moves relatively farther so that both cutter blades finally intersect and cooperate to sever the wire strand.

The wire insertion mechanism has two modes of operation. One mode provides a wire segment having a length slightly longer than the spacing between the two conveyor assemblies. Both pushbar actuators operate simultaneously to sever the wire and cause the pushbars to force both ends of the severed wire segment into their respective conveyor assemblies. The other mode provides a wire segment having a length substantially greater than the spacing between the two conveyor assemblies. When the free end of the wire strand being fed into the passage reaches the end of the passage near the outboard conveyor unit, wire feed stops. Then, the outboard pushbar actuator operates to extend the outboard pushbar and force the free end of the unsevered strand into the infeed end of the outboard conveyor assembly and to extend the separator member. Then, the outboard pushbar retracts, but the separator member remains releasably latched in extended position, and the wire feed device is again operated to feed a loop of the wire strand between the conveyor units. Whereupon, wire feed again stops and the inboard pushbar actuator is operated to sever the wire strand, to cause the inboard pushbar to force the severed end of the wire segment into the infeed end of the inboard conveyor assembly, and to unlatch the separator member to enable it to return to its retracted position.

In both modes, the conveyor units are stopped while a wire is being forced thereinto.

The conveyor mechanism comprises a pair of laterally spaced apart conveyor units. Each conveyor unit (the outboard one of which is adjustably movable relative to the other inboard unit) comprises a support frame on which the wire conveyor assembly is adjustably positionable so as to enable the wire segment end portions of desired length to project foom the sides of the conveyor assemblies.

Wire processing apparatus in accordance with the present invention provides several advantages over the prior art. For example, the improved wire selector/feed mechanism is capable of supporting a large number of wire strands and rapidly selecting and presenting a selected strand to the wire insertion mechanism. The wire selector/feed mechanism can operate precisely at high speed, yet it is fabricated of relatively low-cost, simple, reliable components, as compared to prior art mechanisms which employ a large number of expensive, complex, trouble-prone pneumatic actuators.

The improved wire insertion mechanism employs pushbar actuators whereby each stroke (extension or retraction) of the actuator rod effects one complete cycle of operation (extension and retraction) of its associated pushbar, as compared to prior art wire insertion mechanisms which employ a motor-driven cam to effect pushbar extension and retraction and require a complex and costly motor control and motor brake means to enable precise operation. Applicant's wire insertion mechanism is relatively economical to manufacture and service and is simple and reliable in operation.

The improved conveyor mechanism enables the conveyor assemblies to be adjustably positioned relative to the support frames on which they are mounted so that wire end portions of desired length can extend from the conveyor assemblies. Thus, wire stripping machines and terminal attachment means of different types and sizes can be accommodated.

The improved cutter mechanism is operated by one of the pushbar actuators, rather than by a separate costly drive unit, and the multi-edged blade thereof can be easily repositioned as necessary to ensure that a sharp cutting edge is always available. Furthermore, the cutter mechanism prevents undue bending of the wire strand prior to cutting a wire segment therefrom.

Other objects and advantages of the invention will hereinafter appear.

DRAWINGS

FIG. 15 is a top plan view of the wire feed device of FIG. 14;

FIG. 16 is an enlarged side elevation view, partly in cross-section, of indexing means for the wire selector mechanism of FIGS. 8 and 10;

FIG. 17 is a front elevation view, in reduced scale and partly in cross-section, of the drive means for the wire feed device of FIG. 14;

FIG. 22 is an enlarged view, partly in cross-section, taken on line 22—22 of FIG. 18 and showing a pushbar actuator of the wire insertion mechanism in one stage of operation;

FIG. 23 is an enlarged detail view of a portion of the wire insertion mechanism shown in FIG. 22;

FIGS. 24 and 25 are views similar to FIG. 22 and showing the pushbar actuator at other stages of operation;

DESCRIPTION OF PREFFERED EMBODIMENTS

General Arrangement

Figure 1:
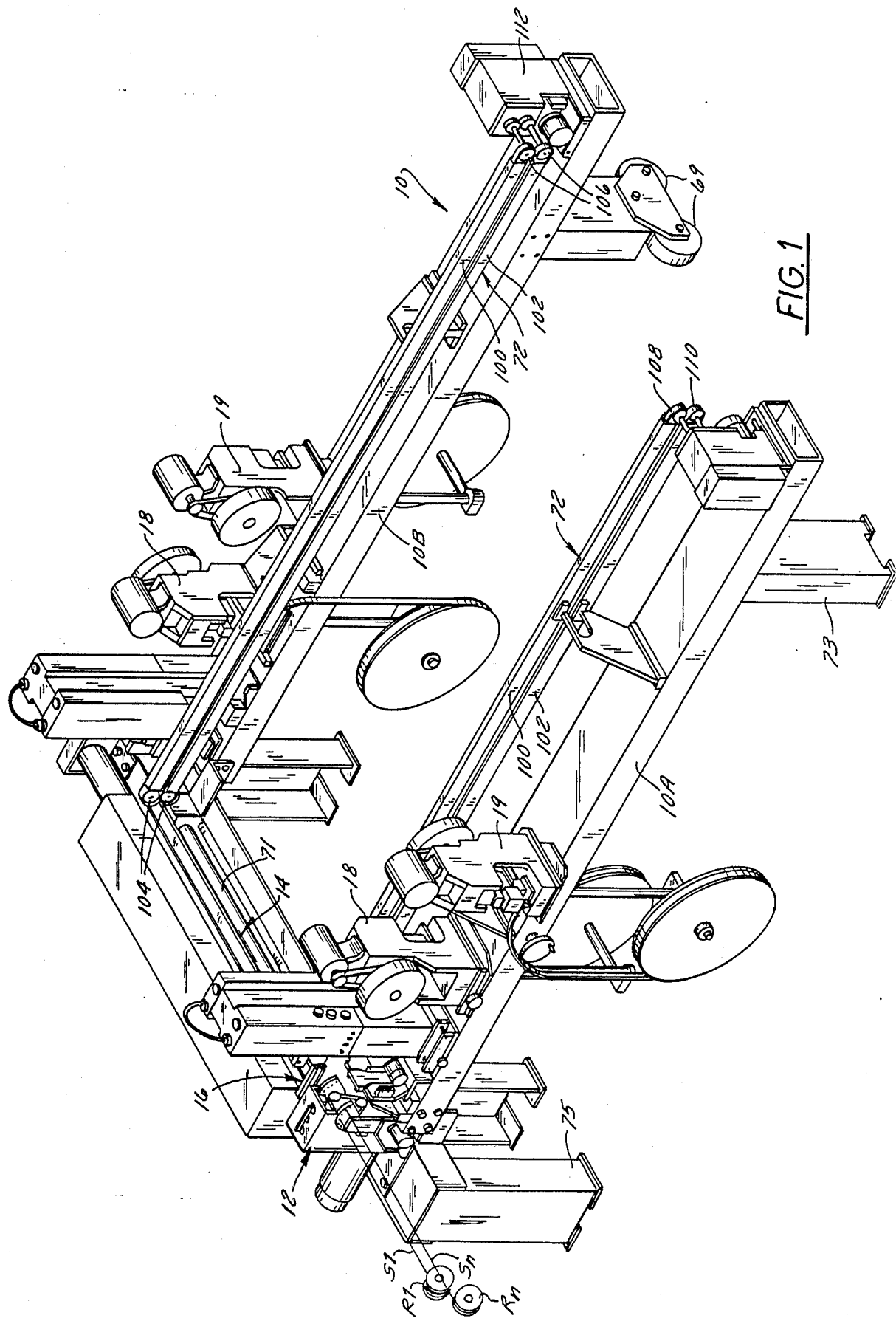
FIG. 1 is an isometric view of wire processing apparatus having mechanisms in accordance with the present invention, including a conveyor mechanism, a wire selector/feed mechanism, a wire insertion mechanism and a wire cutter mechanism.
Figure 2:
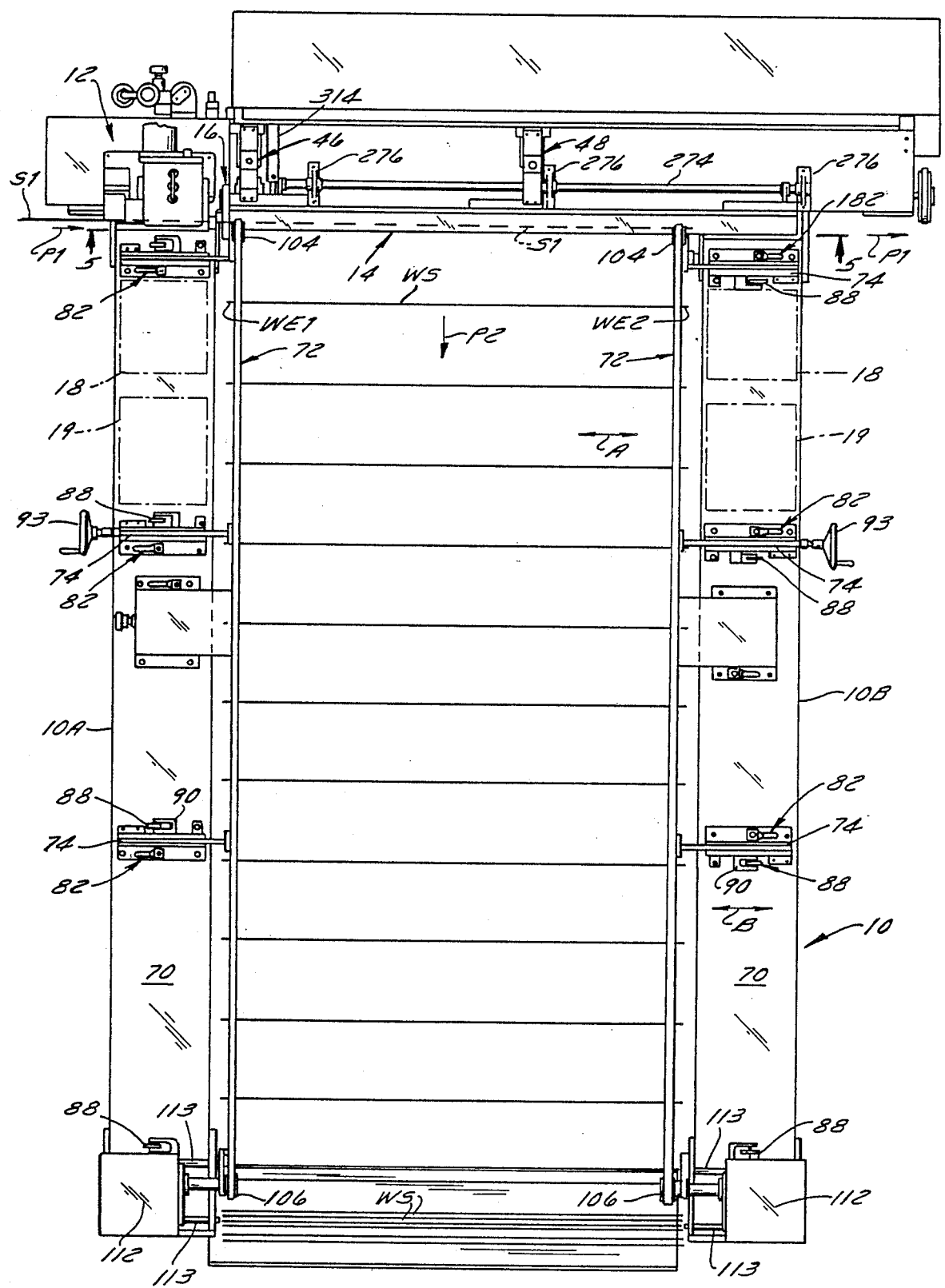
FIG. 2 is a top plan view of the apparatus and mechanisms of FIG. 1.

Referring to FIGS. 1 and 2, wire processing apparatus in accordance with the present invention comprises improved mechanisms, including a conveyor mechanism 10, a wire selector/feed mechanism 12, a wire insertion mechanism 14 and a wire cutter mechanism 16, which mechanisms are generally arranged and operate as foloows. Control means (not shown) are provided to operate the several mechanisms in synchronism.

Conveyor mechanism 10, which has an infeed end and a discharge end, comprises a pair of laterally spaced apart flexible belt type conveyor units, including a stationary inboard conveyor unit 10A and an adjustably movable outboard conveyor unit 10B. Each conveyor unit 10A and 10B comprises a conveyor assembly 72. Wire insertion mechanism 14 extends longitudinally across the infeed end of conveyor mechanism 10 and has a wire strand infeed opening near the infeed end of inboard conveyor unit 10A. Wire selector/feed mechanism 12 is located adjacent the infeed end of wire insertion mechanism 14. Wire cutter mechanism 16 is located between wire selector/feed mechanism 12 and the infeed opening of wire insertion mechanism 14 and is operated by the latter.

Wire selector/feed mechanism 12, which is supplied with a plurality (sixteen, for example) of different wire strands S1 . . . Sn from several wire reels R1 . . . Rn, selects a desired strand (S1, for example) and feeds it along a first path P1 into the infeed opening of wire insertion mechanism 14. Wire insertion mechanism 14 laterally expels a wire segment WS cut from a selected strand by wire cutter mechanism 16 and forces it into the infeed ends of the conveyor assemblies 72 of the conveyor units 10A and 10B for conveyance thereby along a second path P2 which is transverse (perpendicular) to first path P1. Wire segment WS is disposed transverse (perpendicular) to second path P2 along which it is conveyed so that the projecting ends WE1 and WE2 of wire segment WS which project outwardly from the sides of conveyor assemblies 72 of the conveyor units 10A and 10B can be stripped and terminated by machines 18 and 19, respectively, mounted on the respective conveyor units.

Figure 5:
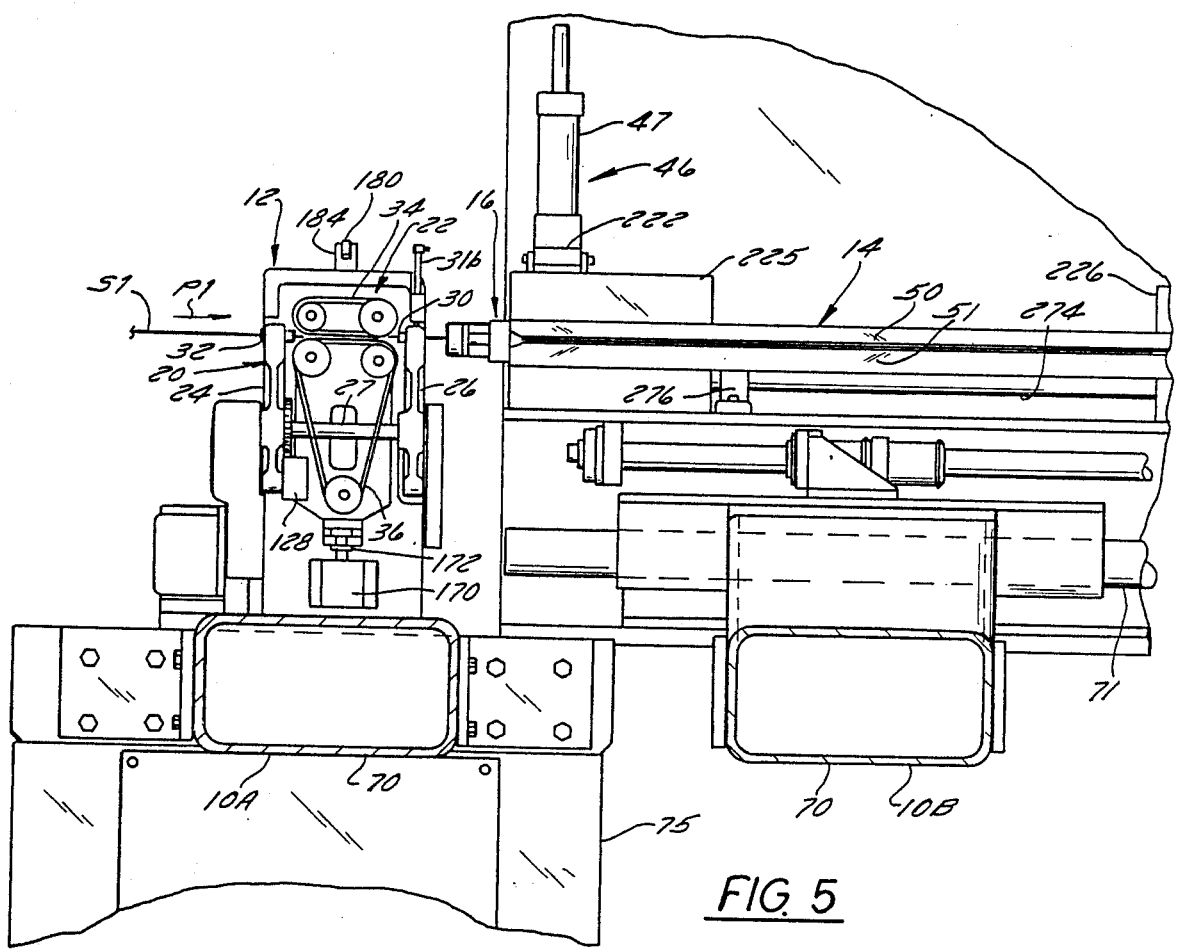
FIG. 5 is an enlarged cross-section view of the conveyor mechanism taken on line 5—5 of FIG. 2 and showing the conveyor units thereof moved closer together.
Figures 10, 11:
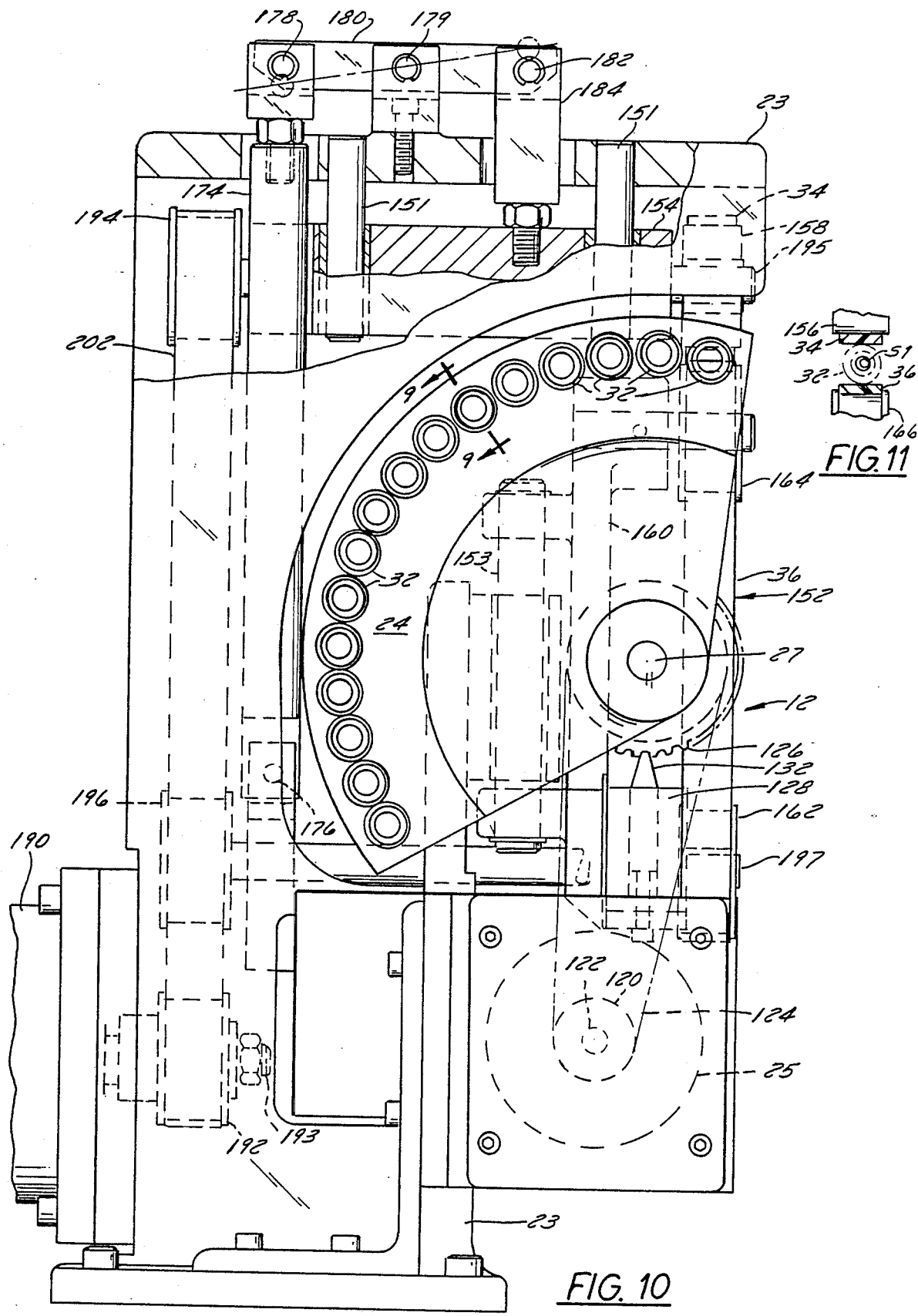
FIG. 10 is an elevation view of the left (outboard) side of the wire selector device of the wire selector/feed mechanism of FIG. 8.
FIG. 11 is a cross sectional view taken along line 11—11 of FIG. 8 showing a wire securing device.

Wire selector/feed mechanism 12 comprises a wire selector device 20 and a wire feed device 22 (FIG. 5). Wire selector device 20 comprises two axially spaced apart (outboard and inboard) rotatably movable plates 24 and 26 between which wire feed device 22 is mounted. Each plate 24 and 26 has a series of holes 28 (FIGS. 10 and 12) arranged in an arc along its peripheral edge and each pair of aligned holes 28 in the two plates 24 and 26 accommodates the free end of a wire strand such as S1. Wire sizing tubes 32 (FIGS. 8 and 9) are removably mounted in the holes 28 in the outboard plate 24. Wire securing pins or devices 30 (FIGS. 12 and 13) in the holes 28 in inboard plate 26 releasably secure each wire strand S1 against accidental withdrawal. Wire feed device 22 comprises a pair of rotatable separable wire feed belts 34 and 36 disposed opposite each other above and below, respectively, first path P1. The belts 34 and 36 are separated to receive a selected wire strand, such as S1, moved therebetween by rotation of the two plates 24 and 26, then close to grip and propel the selected strand S1 (after wire securing device 30 for strand S1 is released) along first path P1 and into the infeed end of wire insertion mechanism 14.

Wire insertion mechanism 14 (FIG. 18) comprises an elongated wire guide 38 (FIG. 23) having an elongated passage 39 for axially receiving selected wire strand S1, a pushbar assembly comprising pushbars 42 (inboard) and 44 (outboard) for laterally expelling a wire from wire guide 38 and into the conveyor assemblies 72 of conveyor units 10A and 10B, respectively, and a pair of (inboard and outboard) pushbar actuators 46 and 48 mounted for moving the pushbars 42 and 44, respectively, between a retracted (FIG. 22) and extended (FIG. 24) position. Wire guide 38 comprises two elongated resilient blades 50 and 52 disposed above, below and parallel to first path P1 which are resiliently movable between closed (FIG. 22) and open (FIG. 24) positions. The two independently movable (inboard and outboard) pushbars 42 and 44 are disposed end-to-end between the blades 50 and 52. Each pushbar 42 and 44 has a retracted position (FIGS. 18 and 22) behind first path P1 wherein it cooperates with the closed blades 50 and 52 to define the elongated passage 39 which receives the selected wire strand S1. Each pushbar 42 and 44 is movable by its actuator 46 and 48, respectively, to an extended position (FIG. 24) wherein it forces an adjacent length of wire strand S1 laterally outwardly from passage 39, out from between the resilient blades 50 and 52 (which temporarily open) and into the infeed end of the conveyor assembly 72 of the associated conveyor unit 10A and 10B, respectively. Each pushbar actuator 46 and 48 comprises a pneumatic actuator 47 which has an extendable/retractable piston rod 54 connected by a mechanical linkage 56 to its associated pushbar 42 and 44, respectively. Each extension (downward) stroke or retraction (upward) stroke of piston rod 54 effects a complete cycle of operation of its associated pushbar 42 or 44, i.e., outward extension and inward retraction. More specifically, a full downward stroke of piston rod 54 causes extension and retraction of the pushbar and a full upward stroke of piston rod 54 caushes extension and retraction of the pushbar. As hereinafter explained, the pushbars are adjustably positionable to change their retracted position so as to change the horizontal width of passage 39 and enable it to accommodate wire strands of different diameters.

Figure 18:
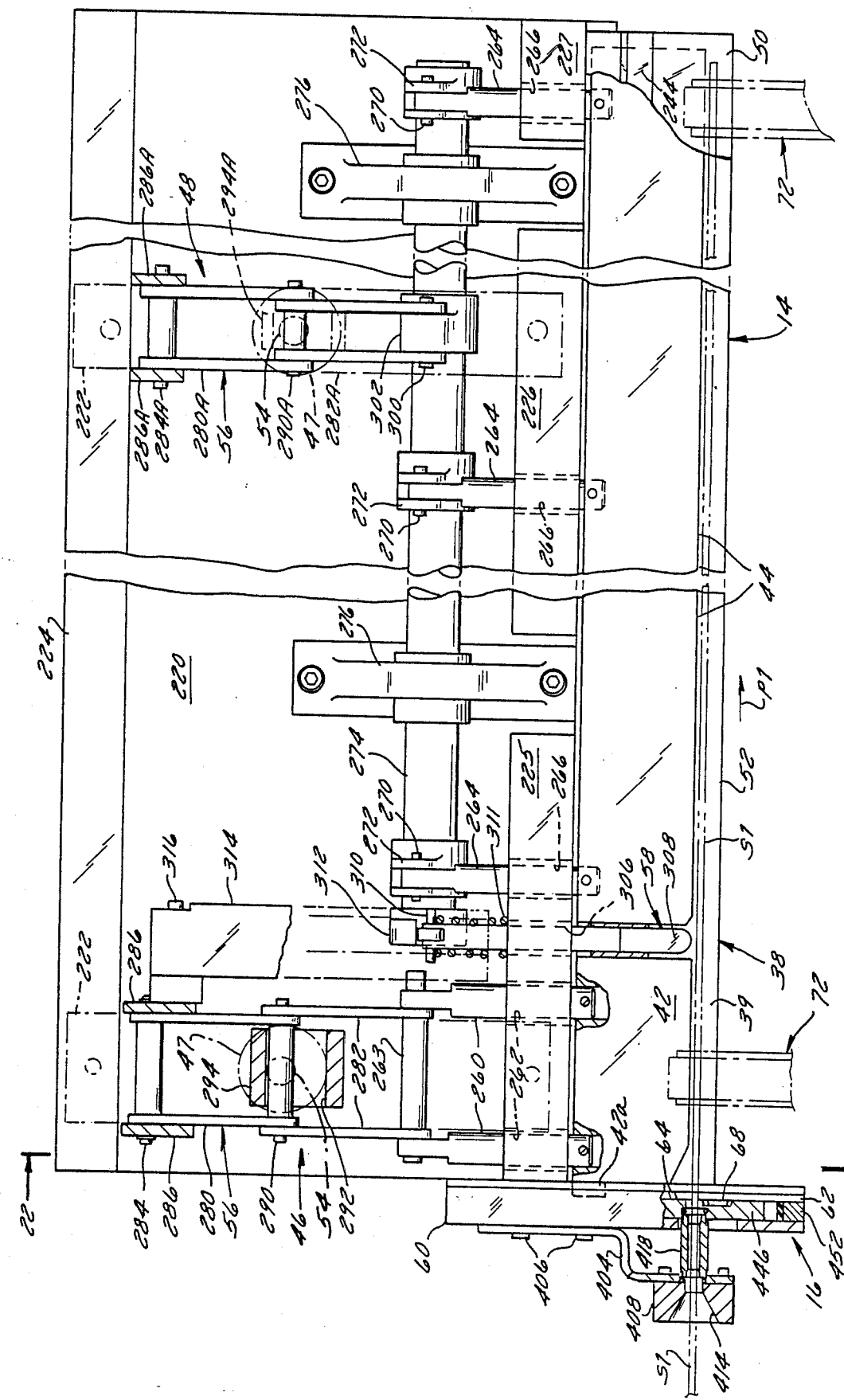
FIG. 18 is an enlarged top plan view of the wire insertion mechanism shown in FIGS. 1 and 2.
Figure 19:
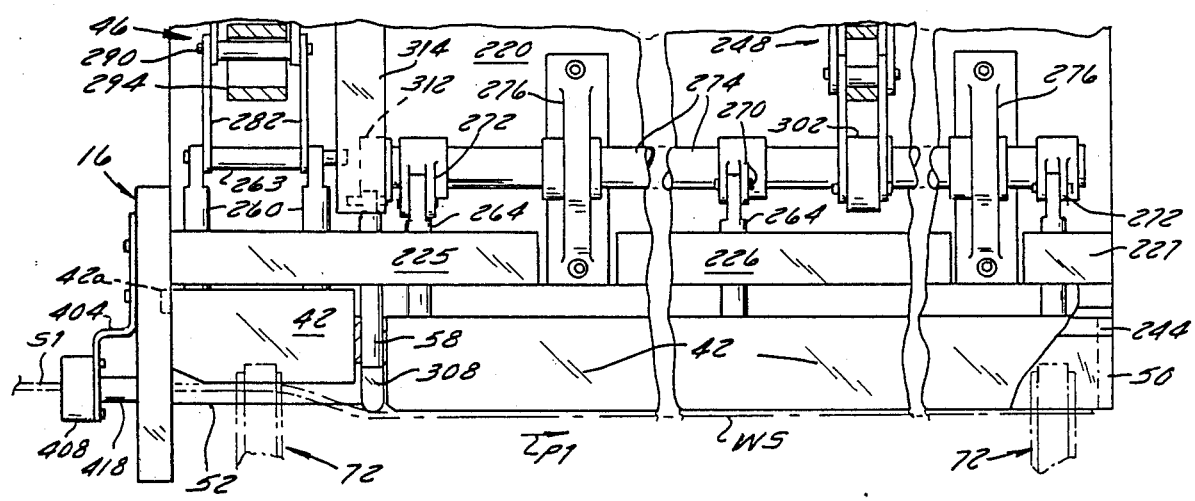
FIGS. 19, 20 and 21 are reduced scale views similar to FIG. 18 and showing the wire insertion mechanism at various stages of operation during production of an extra long wire segment.
Figure 20:
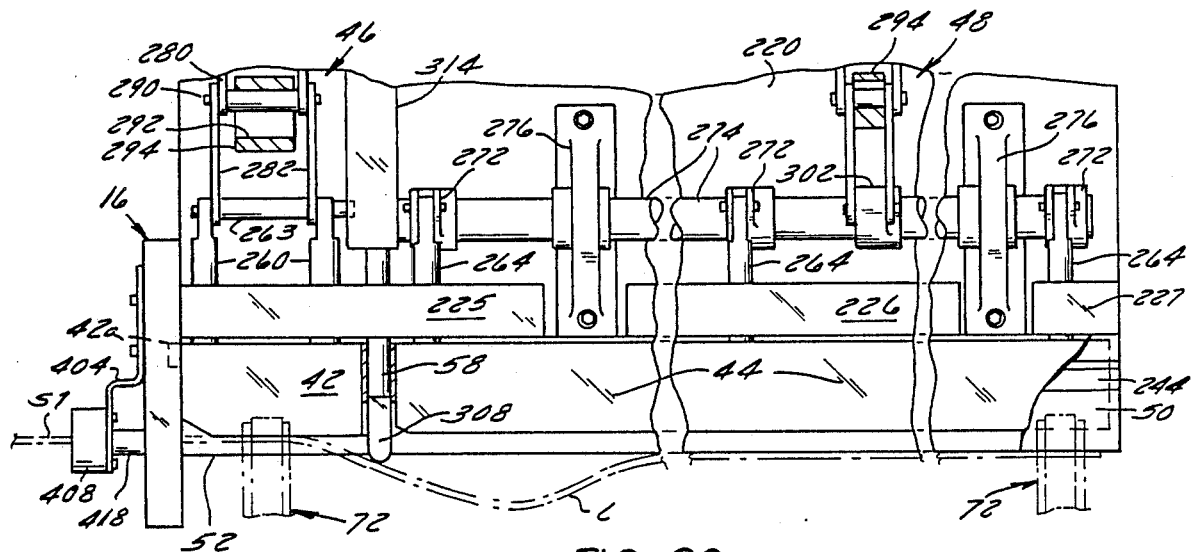
Figure 21:
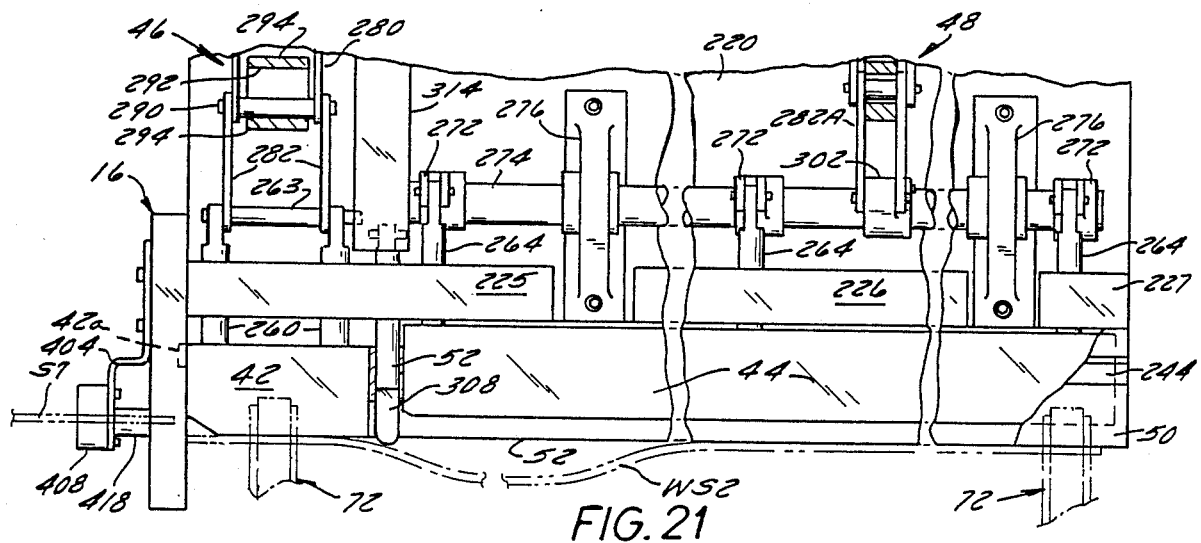

Inboard pushbar actuator 46 also operates wire cutter mechanism 16 (FIG. 18). Outboard pushbar actuator 48 also operates a separator member 58 (FIG. 25) located between the pushbars 42 and 44 which is extendable to separate a portion of the resilient blades 50 and 52 adjacent thereto during certain operations (FIGS. 19, 20, 21).

Wire cutter mechanism 16 (FIGS. 29-32) comprises a stationary housing 60 mounted on wire insertion mechanism 14 and two relatively movable cutter blade holders 446 and 62 slidably mounted within housing 60. The blade holders 62 and 446 support adjustably positionable multi-edged cutter blades 64 and 68. Housing 60 and holders 62 and 446 have holes 66, 478 and 469, respectively, through which selected wire strand S1 extends. Both blade holders 62 and 446 are reciprocably movable by inboard pushbar actuator 46 acting through pushbar 42. Cutter blade 64 moves so that its cutter blade 64 cooperates with cutter blade 68 to sever wire strand S1 and provide a wire segment such as WS, as hereinafter explained in detail.

Wire insertion mechanism 14 has two modes of operation. One mode provides a wire segment such as WS having a length slightly longer than the spacing beween the conveyor assemblies 72 of the two conveyor units 10A and 10B. Both actuators 46 and 48 operate simultaneously to sever wire segment WS and force both ends thereof into the conveyor assemblies 72 of their respective associated conveyor units 10A and 10B. The other mode (FIGS. 19-21) provides a wire segment WS2 (FIG. 21) having a length substantially greater than the spacing between the conveyor assemblies 72 of the two conveyor units 10A and 10B. When the free end of a selected wire strand reaches the outboard end of passage 39 of wire guide 38 of wire insertion mechanism 14 and is past the infeed end of conveyor assembly 72 of outboard conveyor unit 10B, wire feed stops and outboard actuator 48 operates (FIG. 19) to extend outboard pushbar 44 and force the free end of the wire strand into the infeed end of conveyor assembly 72 of outboard conveyor 10B and also to extend separator 58. When separator 58 extends, it opens a space between the blades 50 and 52. The separator member 58 is maintained in extended position while pushbar component 44 retracts and wire feed device 22 is again operated (FIG. 20) to feed the wire strand through the space held open by separator 58 to thereby form a downwardly depending loop of the selected wire strand between the conveyor units 10A and 10B (FIG. 21).

Wire feed again stops and inboard actuator 46 is operated to sever the long wire segment, to force its severed end into the infeed end on conveyor assembly 72 of inboard conveyor unit 10A and to effect retraction of separator member 58.

In both modes of operation, the conveyor assemblies 72 of the conveyor units 10A and 10B are stopped and inoperative while a wire segment is being forced thereinto.

Conveyor mechanism 10 comprises the pair of laterally spaced apart conveyor units 10A and 10B. Each conveyor unit (the outboard unit 10B being adjustably movable in the direction of arrow A in FIG. 2 relative to the inboard unit 10A) comprises a support frame 70 on which a conveyor belt assembly 72 is adjustably positionable in the direction of arrow B (FIG. 2) so as to enable a desired length of an end portion WE1 or WE2 of a wire segment to project from the outer side of a conveyor belt assembly 72.

Each of the several mechanisms 10, 12, 14 and 16 will now be described in detail.

Conveyor Mechanism

Referring to FIGS. 1 through 7, conveyor mechanism 10 comprises the inboard conveyor unit 10A and the outboard conveyor unit 10B. Conveyor unit 10B is supported at its discharge end on wheels 69 and at its other end on a slide bar 71. Means (not shown) are provided to adjustably move unit 10B laterally toward and away from unit 10A to accommodate wire strands of different lengths.

The conveyor units 10 and 10B are essentially mirror images of each other and, therefore, only unit 10A is hereinafter described in detail. Unit 10A comprises the support frame 70 on which a wire stripping machine 18, a wire terminating machine 19 and a conveyor belt assembly 72 are mounted. Support frame 70 takes the form of an elongated hollow box girder having its discharge end supported by a leg 73 and having its infeed end supported by a support frame 75.

Figure 6:
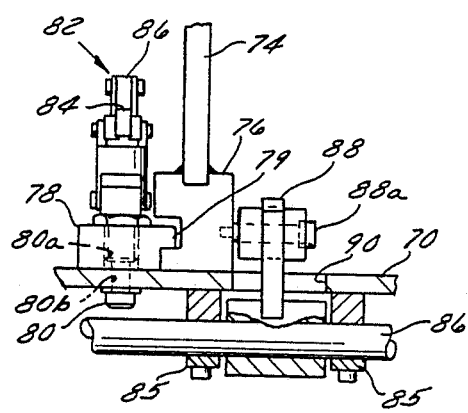
FIG. 6 is an enlarged cross-section view taken on line 6—6 of FIG. 3 and showing a locking device for the support brackets of FIG. 3.
Figure 3:
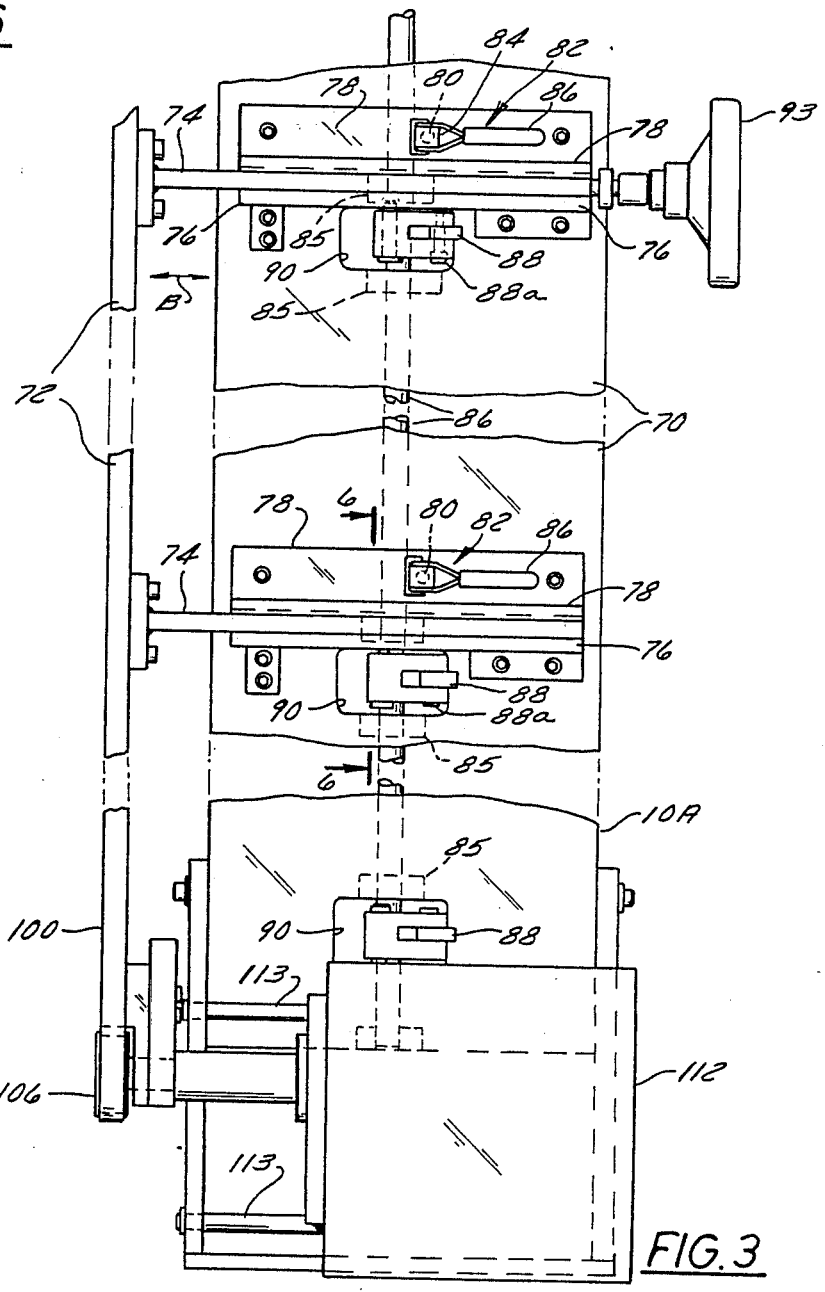
FIG. 3 is an enlarged top plan view of a portion of the conveyor mechanism of FIGS. 1 and 2.

Referring to FIGS. 3 and 6, conveyor belt assembly 72 is mounted on support frame 70 by means of a plurality of (three) adjustably positionable upwardly extending support brackets 74. Each support bracket 74 has a grooved base member 76 secured to its lower edge which is slidably engaged with a member 78 having a tongue 79. Member 78 is secured to frame 70 by a releasable locking device 82. Releasable locking device 82 is mounted on member 78 and comprises an axially movable locking pin 80, a locking cam 84 and a manual operating lever 86. Locking pin 80 extends through a hole 80a in member 78 and through a slot 80b in supoort 70. When lever 86 of locking device 82 is moved downward to locked position, tongue 79 of member 78 is forced into tight clamping engagement with base member 76 of bracket 74 and this prevents sliding movement of bracket 74 relative to support frame 70. When lever 86 of locking device 82 is moved upward to released position, bracket 74 can be slidably moved in the direction of arrow B to a desired position. Note that conveyor assembly 72 of conveyor unit 10A is thus movable toward or away from the cutting plane of cutter mechanism 16 which is mounted in a fixed position. Thus, the length of end portion WE1 of a wire segment can be varied. The length of end portion WE2 can be similarly varied.

Figure 7:
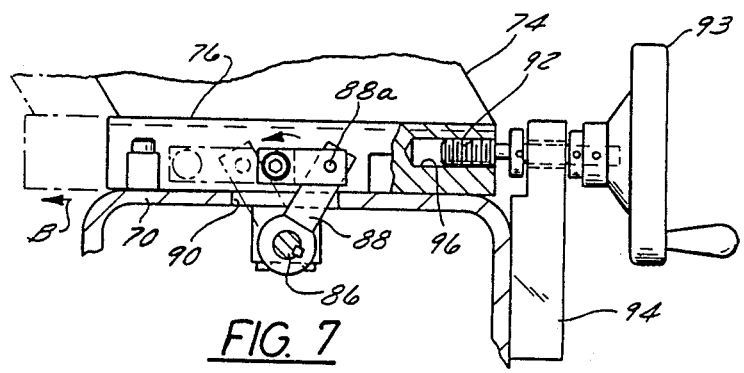
FIG. 7 is an enlarged side elevation view of a device for adjustably positioning the support brackets of FIG. 3.

Referring to FIGS. 3, 6 and 7, means are provided to slidably move the three support brackets 74 in unison when their respective locking devices 82 are released. Such means comprise an elongated rod 86 which is rotatably mounted within hollow support frame 70 on supoort members 85 and which has three lever arms 88 rigidly secured thereto and rotatable therewith through an arc. Each lever arm 88 projects through a slot 90 in the upper side of support frame 70 and engages, by means of a pin 88a, the base member 76 of a support bracket 74 to effect sliding movement thereof in the direction of arrow B when rod 86 is rotated through an arc.

Referring to FIGS. 3 and 7, means are provided to rotate rod 86 to thereby slidably position the three support brackets 74. Such means comprise a screw 92 which is rotatably supported on support frame 74 by a bracket 94 and has a hand-wheel 93 whereby the screw can be selectively rotated in opposite directions. The threads of screw 92 engages an internally threaded hole 96 which is formed in the side of base member 78 of a support bracket 74. Referring to FIG. 7, assuming that all three locking devices 82 are released, manual rotation of screw 92 slidably moves its associated support bracket 74 and this, in turn, pivotably moves the associated lever arm 88 to effect rotation of rod 66, as comparison of the solid lines and phantom lines in FIG. 7 shows. Rod rotation, in turn, correspondingly moves the two other lever arms 88 and causes sliding movement of the other two support brackets 74.

Figure 4:
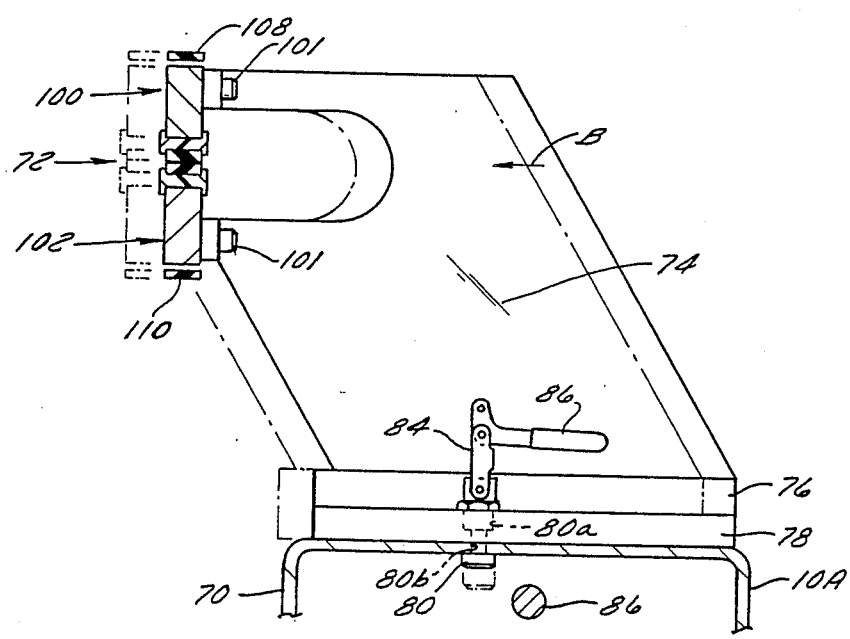
FIG. 4 is an enlarged side elevation view of a conveyor assembly support bracket of FIG. 3.

Referring to FIGS. 1 and 4, conveyor belt assembly 72, which is mounted on and adjustably movable with the support brackets 74, comprises a rigid elongated upper belt support structure 100 and a rigid elongated lower belt structure 102. Each belt structure 100 and 102 is rigidly secured to and movable with the support brackets 74 by bolts 101. Each structure 100, 102 rotatably supports an idler roller 104 near its infeed end and a driven roller 106 at its discharge end. The rollers on upper structure 100 rotatably support an endless flexible upper conveyor belt 108. The rollers on lower structure 102 rotatably support an endless flexible lower conveyor belt 110. The driven rollers 106 on the upper and lower structures 100 and 102 are connected to be rotatably driven by a conveyor belt drive mechanism 112 located at the discharge end of conveyor unit 10A. Belt drive mechanism 112 is slidably mounted on slide rods 113 secured to support frame 70, as FIG. 2 shows. Thus, drive mechanism 112 can move in the direction of arrow B in unison with the belt structures 100 and 102 as the latter are adjustably moved by the support brackets 74. The conveyor belts 108 and 110 have confronting belt flights between which a wire segment can be trapped for conveyance. The outer surface of the belts comprises resilient or spongy material which facilitates lateral insertion of the wire segments and also ensure a firm grip on the wire segment, as FIG. 24 shows.

Wire Selector/Feed Mechanism

Referring to FIGS. 1, 2, 5 and 8 through 17, wire selector/feed 12, which is understood to be supplied with a plurality of different wire strands such as S1 from several wire reels such as R1, selects a desired strand (S1, for example) and feeds it along first path P1 into the infeed end of wire insertion mechanism 14. Wire selector/feed mechanism 12 comprises the wire selector device 20 and the wire feed device 22, both mounted on a support means 23.

Figure 8:
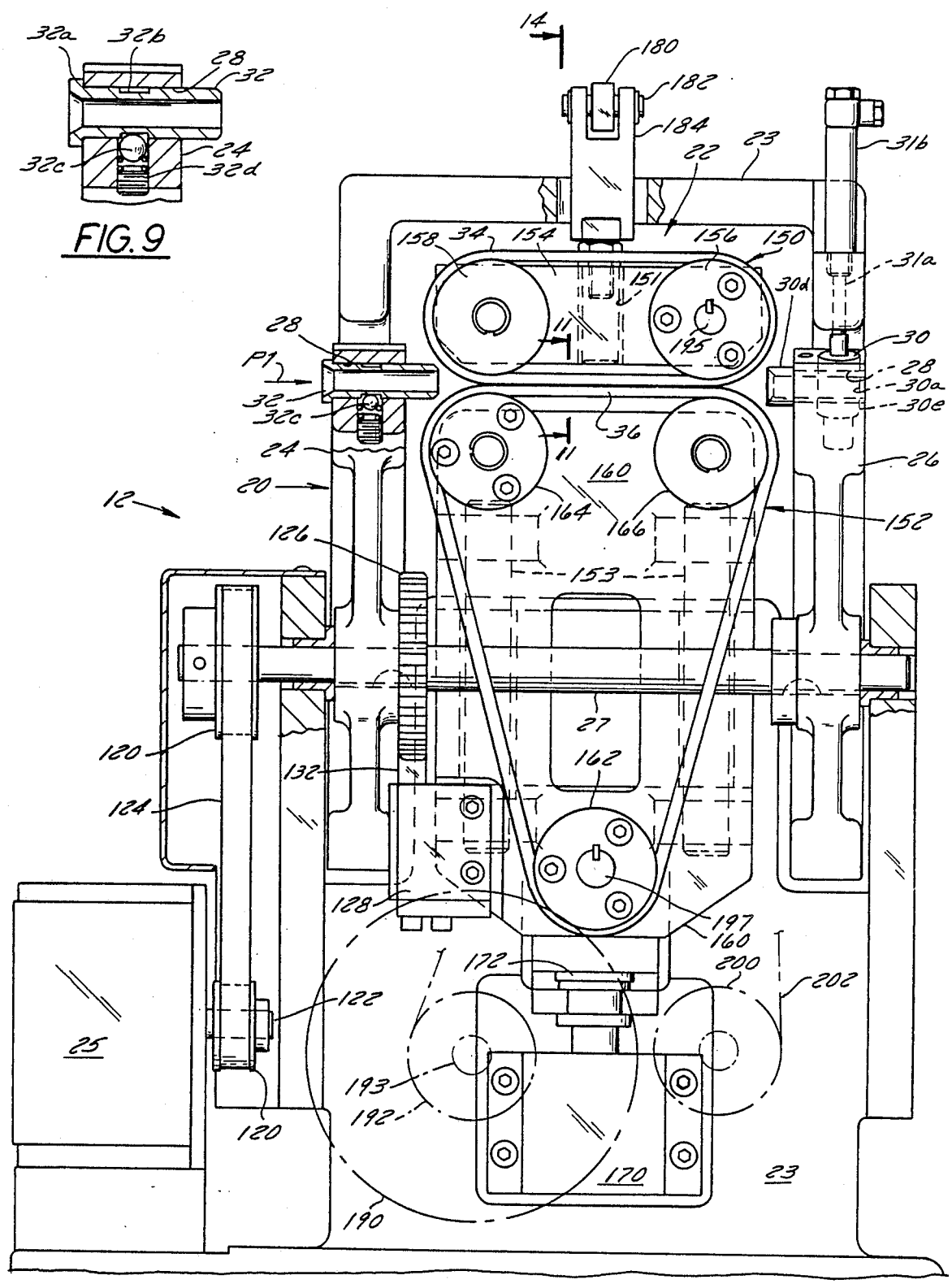
FIG. 8 is an enlarged front elevation view of the wire selector/feed mechanism of FIGS. 1, 2 and 5.

Referring to FIG. 8, wire selector device 20 comprises two axially spaced apart (outboard and inboard) perforated rotatably movable plates 24 and 26 between which wire feed device 22 is mounted. Each plate 24 (FIG. 10) and 26 (FIG. 12) has a plurality (sixteen shown) of holes 28 arranged in spaced apart relation in an arc along its peripheral edge and each pair of aligned holes 28 in the two plates 24 and 26 accommodates the free end of a wire strand such as S1 and releasably supports it.

Figure 9:
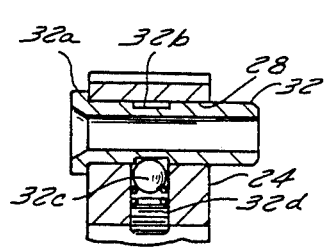
FIG. 9 is an enlarged cross-section view of a wire guide tube taken on line 9—9 of FIG. 10.

Wire sizing tubes, such as tube 32 in FIGS. 8 and 9, are removably mounted in the holes 28 in the outboard plate 24. The tube 32 facilitates sliding of a wire strand of given diameter through hole 28. Each wire sizing tube 32 has a flange 32a at one end and a groove 32b around its shank which is releasably engaged by a spring-biased ball detent 32c located in a hole 32d in the plate 24. This enables secure mounting of a tube 32 of specific internal diameter but enables easy removal and replacement thereof by another of having a different internal diameter to accommodate a wire strand of appropriate diameter.

Figures 12, 13:
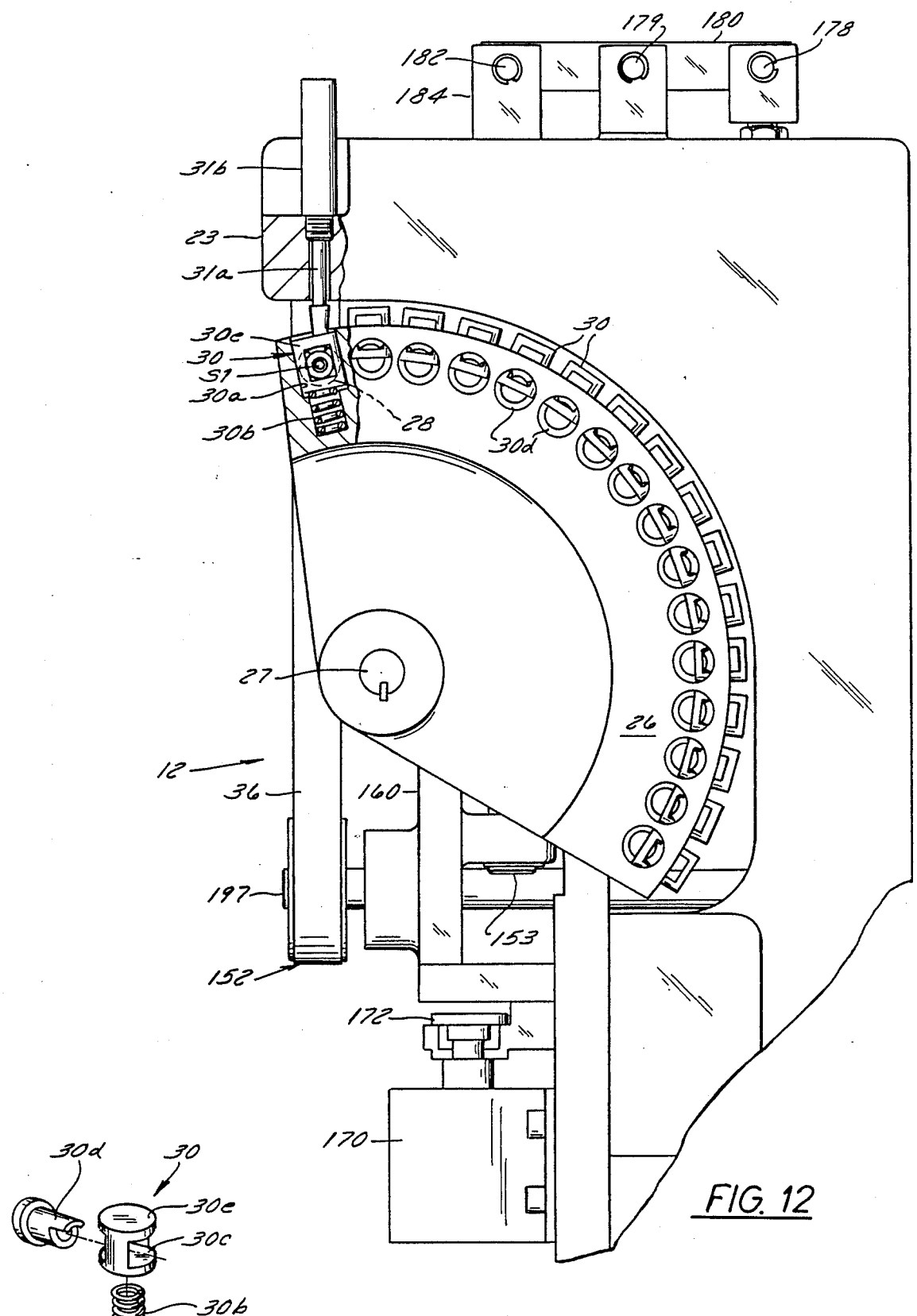
FIG. 12 is an elevation view of the right (inboard) side of the wire selector device of the wire selector/feed mechanism of FIG. 8.
FIG. 13 is an isometric view of a wire trapping device shown in FIG. 12.
Figure 14:
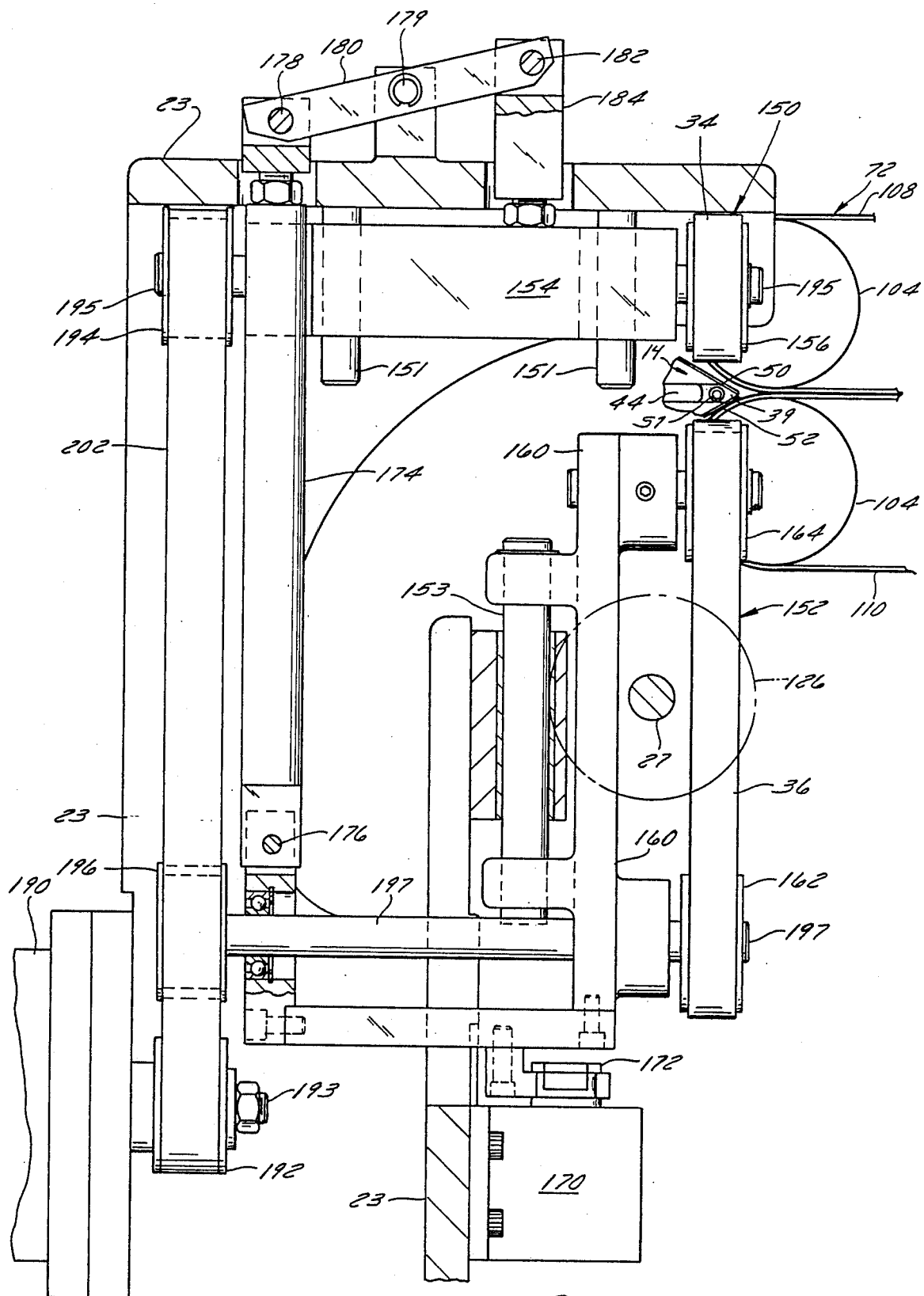
FIG. 14 is a side elevation view, partly in cross-section, of the wire feed device of the wire selector/feed mechanism taken on line 14—14 of FIG. 8.

Referring to FIGS. 8, 12 and 13, wire securing devices 30 are located in the holes 28 in inboard plate 26 and operate to releasably secure each wire strand extending therethrough against accidental withdrawal. Each wire securing device 30 is disposed in a bore 30a which extends inwardly from the outer peripheral edge of plate 26 and transversely intersects its associated wire receiving hole 28 in plate 26. A wire securing device 30 comprises a biasing spring 30b and a pin 30e disposed in bore 30a. Spring 30b biases pin 30e, which has a wire-receiving hole 30c therethrough, outwardly to a position wherein it engages and entraps a wire strand extending through hole 30c. A grommet 30d is disposed in the associated hole 28 in plate 26 to provide smooth passage for the wire strand. Means are provided to depress pin 30e and release the trapped wire strand and such means comprise an axially movable piston rod 31a of a pneumatic actuator device 31b which is mounted on support 23. Device 31b is actuated to extend its piston rod 31a to move wire securing pin 30 downward against spring bias to its wire-release position in synchronism with the actuation of wire feed device 22, i.e., so as to release the wire strand when the feed belts thereof close upon the wire strand.

Referring to FIGS. 8 and 14 through 17, wire feed device 22 of wire selector/feed mechanism 12 comprises a pair of rotatable separable wire feed belts 34 and 36 disposed opposite each other above and below first path P1. The belts 34 and 36 are separated (as in FIG. 14) to receive a selected wire strand, such as S1, moved therebetween by rotation of the two plates 24 and 26, then close (as in FIG. 8) to grip and propel a selected wire strand S1 (after wire securing pin 30e for strand S1 is released) along first path P1 and into the infeed end of wire insertion mechanism 14. The belts 34 and 36 rotate continuously when the mechanism 12 is in operation.

Referring again to wire selector device 22, the pair of plates 24 and 26 are rigidly secured on a shaft 27 which is rotatably mounted on support 23. Plates 24 and 26 are spaced apart from one another in the direction of path P1 and are disposed and rotate through an arc transversely to path P1. To effect wire selection, the plates 24 and 26 are selectively rotatable simultaneously by an electric motor 25 on support 23 about an axis parallel to path P1 to positions wherein each selected set of holes 28 is aligned with path P1. Motor 25, which is a stepping motor which can be precisely rotated in small increments, has a drive pulley 120 on its drive shaft 122 which is connected by an endless flexible drive belt 124 to a driven pulley 120 on plate shaft 27. Plate shaft 27 also has an indexing gear 126 (FIGS. 8, 10 and 16) rigidly secured thereto which cooperates with an indexing assembly 128 mounted on a yoke 160. Yoke 160 is reciprocally movable vertically on support 23, as hereinafter described. As FIG. 16 shows, indexing assembly 128 comprises a housing 130, a pin 132 axially movable in the housing 130 and a spring 134 for biasing the pin outwardly of the housing. The housing 130 moves vertically with yoke 160 to move pin 132 into and out of engagement with indexing gear 126. In operation of wire selector device 22, yoke 160 moves downward as the wire feed device 22 opens to thereby effect retraction of pin 132 out of engagement with indexing gear 126. Then, motor 25 is operated to rotate plate shaft 27 and the plates 24 and 26 thereon to a position wherein a selected wire strand such as S1 iis aligned with path P1, whereupon the motor is stopped and yoke 160 moves upward to move pin 132 into engagement with the appropriate gear tooth to thereby lock the plates in the selected position.

The wire feed device 22 comprises an upper feed belt assembly 150 and a lower feed belt assembly 152, both of which are movably mounted on support 23 and are reciprocably movable vertically toward and away from each other. Upper feed belt assembly 150 comprises a plate 154 on which a driven roller 156 and an idler roller 158 are rotatably mounted. Slide rods 151 (FIG. 14) on support 23 slidably support plate 154 for vertical movement. The rollers 156 and 158 rotatably support endless flexible upper wire feed belt 34. Lower feed belt assembly 152 comprises a plate or yoke 160 on which a driven roller 162 and two idler rollers 164 and 166 are rotatably mounted. Slide rods 153 (FIGS. 8 and 14) on support 23 slidably support yoke 160 for vertical movement. The rollers 162, 164 and 166 rotatably support endless flexible lower wire feed belt 36.

Means are provided to effect reciprocating vertical movement of upper assembly 150 and lower assembly 152 in opposite directions relative to one another. Such means comprise a pneumatic actuator 170 mounted on support 23 and having an axially movable piston rod 172 which is mechanically connected to the lower end of yoke 160. A vertical extending drive rod 174 is pivotably connected at its lower end by a pivot pin 176 to the lower end of yoke 160. The upper end of drive rod 174 is pivotably connected by a pivot pin 178 to one end of a lever arm 180, as FIGS. 8, 14, 15 and 16 show. The lever arm 180 is pivotably mounted intermediate its ends on a pivot pin 179 on the top of support 23 and the other end of lever arm 180 is pivotably connected by a pivot pin 182 to a bracket 184 which is secured to plate 154 of upper feed belt assembly 150. Thus, when pneumatic actuator 170 operates to move yoke 160 downwardly, plate 154 moves upwardly and the feed belts 34 and 36 separate. Conversely, upward movement of yoke 160 by actuator 170 effects downward movement of plate 154 and the confronting flights of the feed belts 34 and 36 close to engage a wire strand disposed therebetween on path P1 by wire selector device 20.

Referring to FIGS. 8, 14, 15 and 17, means are also provided to continuously rotate the feed belts 34 and 36 and thereby propel a wire strand therebetween along path P1 when the confronting belt flights of belts 34 and 36 close and grip the wire strand. Such means comprise an electric motor 190 mounted on support 23 and having a drive pulley 192 rigidly mounted on motor drive shaft 193. Such means further comprise a driven pulley 194 on a drive shaft 195 on which driven roller 156 of upper feed belt assembly 150 is mounted, a driven pulley 196 on a drive shaft 197 on which driven roller 162 of lower feed belt assembly 152 is mounted, an idler pulley 200 rotatably mounted on support 23, and an endless flexible drive belt 202 which is reeved around the pulleys 192, 196, 200 and 194. Note that belt 202 is of fixed length, but that vertical displacement of the two pulleys 194 and 196 in opposite directions as the feed belt assemblies 150 and 152 open and close compensates so as to maintain belt 202 taught.

Wire Insertion Mechanism

Wire insertion mechanism 14 (FIG. 18) comprises an elongated wire guide 38 (FIG. 23) having an elongated passage 39 for axially receiving selected wire strand S1, a pushbar assembly comprising pushbars 42 and 44 for laterally expelling wire segment from wire guide 38 and into the conveyor assemblies 72 of conveyor units 10A and 10B, respectively, and a pair of (inboad and outboard) pushbar actuators 46 and 48 mounted for moving the pushbar components 42 and 44, respectively, between a retracted (FIG. 22) and extended (FIG. 24) position. Wire guide 38 comprises two elongated resilient blades 50 and 52 disposed above, below and parallel to first path P1. The blades 50 and 52 are resiliently movable from closed (FIG. 22) position to open (FIG. 24) position as a pushbar moves therebetween. The two independently movable (inboard and outboard) pushbars 42 and 44 are disposed end-to-end between the blades 50 and 52. Each pushbar 42 and 44 has a retracted position (FIGS. 18 and 22) behind first path P1 wherein it cooperates with the closed blades 50 and 52 to define the elongated passage 39 which receives the selected wire strand S1. Each pushbar 42 and 44 is movable by its actuator 46 and 48, respectively, to an extended position (FIG. 24) wherein it forces an adjacent length of wire strand S1 laterally outwardly from passage 39, out from between the resilient blades 50 and 52 and into the infeed end of the conveyor assemblies of the associated conveyor units 10A and 10B, respectively.

Referring to FIGS. 1, 2 and 18 through 28, wire insertion mechanism 14 comprises a support structure comprising a bottom plate 220, a top plate 222, a rear plate 224 and a front side defined by three front plates 225, 226 and 227, all of which are rigidly secured together as by bolts 230 and 231 to form a hollow support structure. The bolts 231 secure top plate 222 to the front plate 224 and rear plate 224 and extend through slots 250 in the upper plate 222. The three front plates support wire guide 38 which includes a pushbar mounting structure comprising an elongated rear spacer member 234 which is rigidly secured to the outside of the three front plates 225, 226 and 227. Spacer member 234 provides support for upper and lower elongated blade support members 236 and 238, respectively, which are rigidly secured thereto in spaced apart relationship to each other to define an elongated space 240 therebetween. The front portion of space 240 defines the passage 39 which is coincident with path P1 and is adapted to receive a wire strand therethrough, as well as to accommodate passage of the pushbars 42 and 44 and separator member 58. Each blade support member 236 and 238 has a generally triangular transverse cross-sectional configuratinn. The resilient upper and lower blades 50 and 52 are mounted on the blade support members 236 and 238, respectively, being secured thereto near their rear edges by bolts 242 which extend through elongated clamping plates 244. The front edges of the blades 50 and 52 project beyond the front tips of the support members 236 and 238, respectively, and have a normally closed position shown in FIGS. 22 and 23. However, the front edges of the blades 50 and 52 are resiliently movable to an open position as shown in FIG. 24 in response to lateral movement of a wire strand therebetween and subsequent passage of the pushbars 42 and 44 and the separator member 58 therebetween. Upon retraction of the pushbars 42 and 44 and the separator member 58, the blades 50 and 52 reclose because of their resiliency.

Each pushbar 42 and 44 is slidably mounted in space 240 between the blade support members 236 and 238. Pushbar 42 is connected to and movable by two rods 260 which are slidably mounted in two bores 262 in front plate 225. The two rods 260 are joined together by a pivot pin or bar 263 which is connected to the mechanical linkage 56 of pneumatic actuator 47 of pushbar actuator 46. Pushbar component 44 is connected to and movable by three slide rods 264 which are slidably mounted in three respective bores 266, one bore 266 being formed in each of front plates 225, 226 and 227. Each slide rod 264 is connected by a pivot pin 270 to a lever arm 272 which is rigidly secured to and rotatable by a drive shaft 274 which is supported for rotation on two journals 276 rigidly secured to bottom plate 220.

Referring to FIGS. 18, 22 and 24, each pushbar actuator 46 and 48 generally comprises pneumatic actuator 47 which has its extendable/retractable piston rod 54 connected by mechanical linkage 56 to an associated pushbar 42 or 44, respectively. Each extension (downward) or retraction (upward) stroke of piston rod 54 effects a complete cycle of operation of its associated pushbar 42 or 44, i.e., outward extension and inward retraction.

Each pneumatic actuator 47 is rigidly mounted on top plate 222 of the support structure of mechanism 14. Top plate 222 has elongated slots 250 which accommodate the bolts 231 and this arrangement enables top plate 222, when the screws 231 are loosened, to be adjustably positioned fore and aft in the direction of arrow D to thereby correspondingly move the pneumatic actuator 47 and linkage 56. Such repositioning changes the retracted position of the associated pushbar 42 or 44 and thereby changes the width of wire passage 39 in wire guide 38.

Inboard pushbar actuator 46, acting through pushbar 42 which is made of metal, also operates wire cutter mechanism 16 (FIG. 18) by means of a projection 46a thereon. Outboard pushbar actuator 48 acting through a rotatable shaft 274 and a lever arm 312 also operates separator member 58 (FIG. 25), as hereinafter described in detail, which is extendable to separate a portion of the resilient blades 50 and 52 during certain operations (FIGS. 19, 20, 21).

The mechanical linkages 56 for the pneumatic actuators 47 of the actuators 46 and 48 are generally similar and, therefore, only the linkage 56 of actuator 46 for operating pushbar 42 will now be described in detail. Furthermore, since each linkage 56 comprises two identical sets of links arranged in parallel, only one set of links will be described. Thus, one set of links comprises two links, namely, a rear link 280 and a front link 282. Rear link 280 is pivotably connected at its rear end by a pivot pin 284 which, as FIG. 18 shows, is attached to a mounting plate 286 which is iigidly secured in fixed position by bolts 288 to a side of top plate 222. Rear link 280 is pivottably connected at its front end by a pivot pin 290 which is pivotably connected to the rear end of front link 282. Front link 282 is pivotably connected at its front end to bar 263 which joins the push rods 200 for pushbar 42. The pivot pin 290 is slidably movable fore and aft in a slot 292 formed in an attachment bracket 294 which is rigidly secured to the lower end of piston rod 54 of pneumatic actuator 47. Thus, when piston rod 54 is fully retracted upward (FIG. 22), the links 280 and 282 assume the position shown in solid lines in FIG. 22 and the pushbar 42 is fully retracted. When piston rod 54 is extended halfway (FIG. 24), the links 280 and 282 assume the positions shown in solid lines in FIG. 24 and the pushbar 42 is fully extended. When piston rod 54 is fully extended, the links 280 and 282 assume the position shown in dashed lines in FIG. 22 and the pushbar 42 is again fully retracted.

The linkage 56 for pneumatic actuator 47 of pushbar actuator 48 for pushbar 44 is constructed and operates in the manner hereinbefore described, except that its front link 282A is pivotably connected at its front end by a pin 300 to a lever arm 302 which is rigidly secured to shaft 274. Thus, when linkage 56 in pushbar actuator 48 is operated, it effects corresponding rotation of shaft 274 and corresponding movement of pushbar 44.

Figure 25:
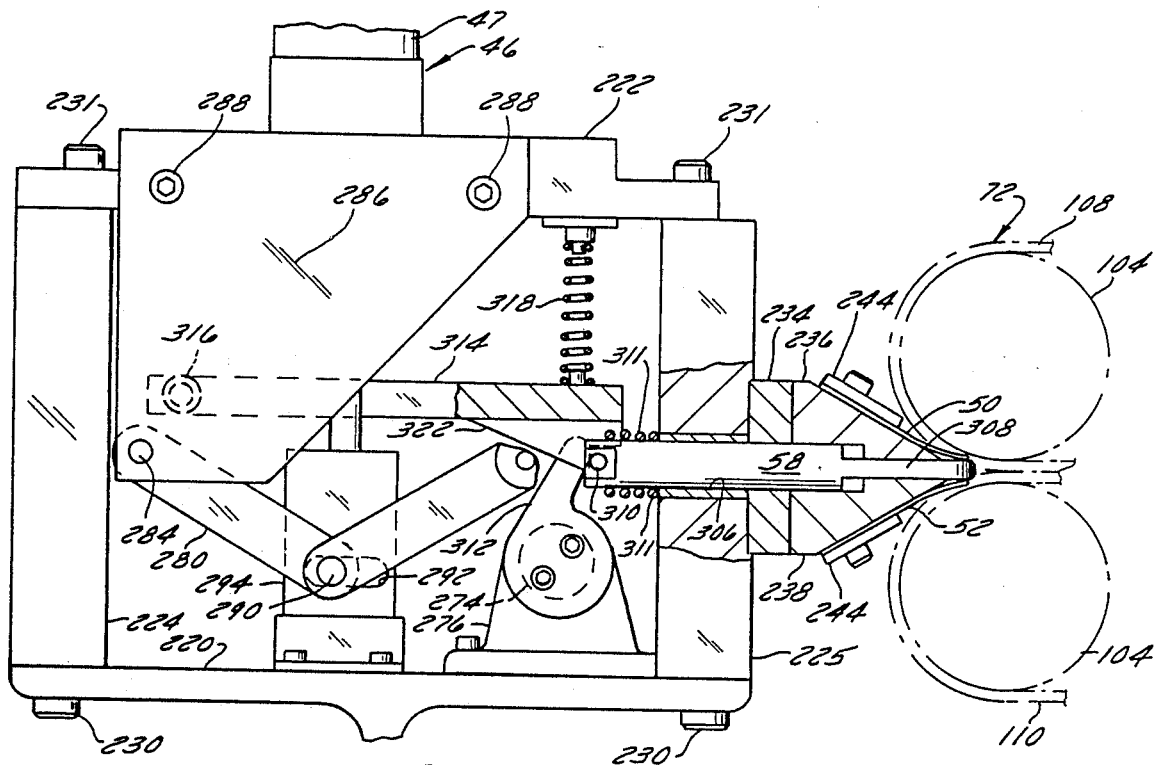
Figure 26:
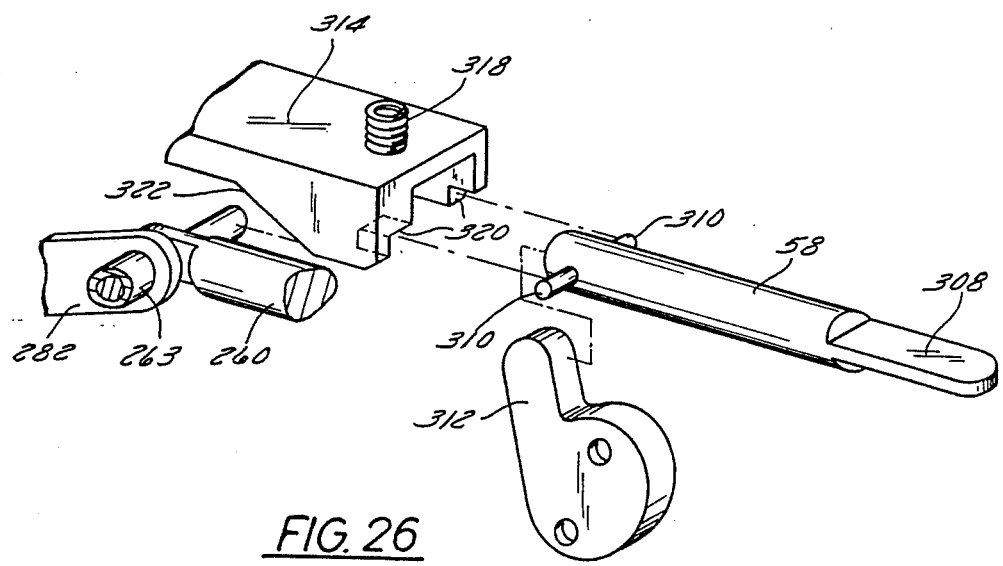
FIG. 26 is an enlarged perspective view of a blade separator of the wire insertion mechanism shown in FIGS. 18-21 and 25.
Figure 27:
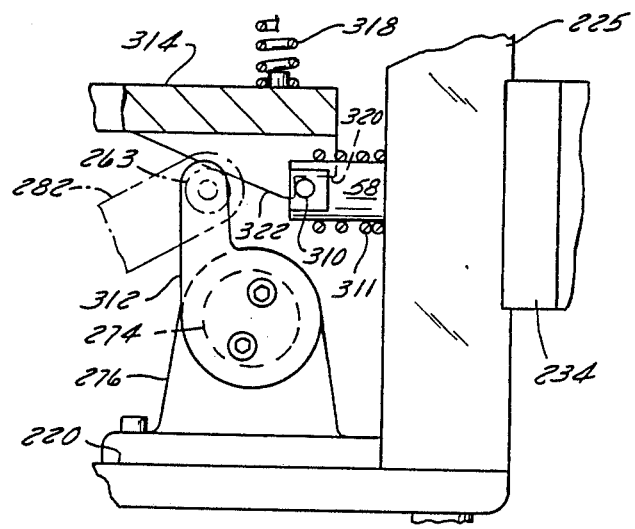
FIGS. 27 and 28 are enlarged side elevation view, partly in cross-section, of the blade separator of FIG. 26 showing it in latched and unlatched positions, respectively.
Figure 28:
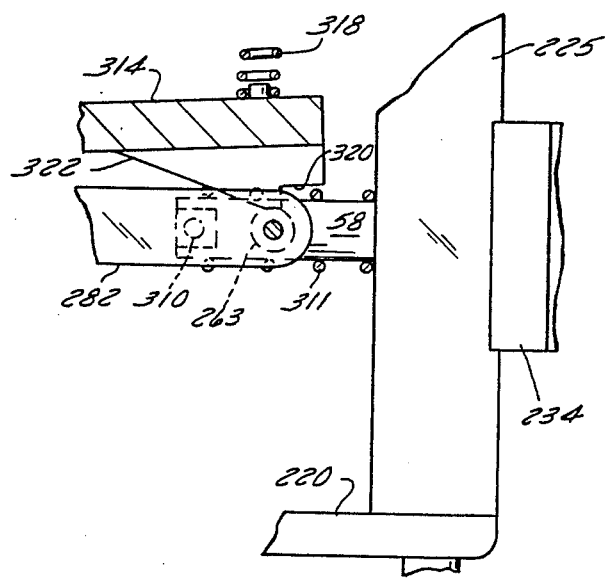

Referring to FIGS. 18, 22 and 24 through 28, the separator member 58 and the operating means therefor will now be described. Separator member 58, which is fabricated of metal, is slidably mounted in a bore 306 in front plate 225 and has a flat tongue 308 at its front end and a laterally projecting pin 310 near its rear end. A compression spring 311 is disposed around separator member 58 between front wall 225 and the projecting ends of pin 310 to bias member 58 rearwardly. Separator member 58 is movable to its extended position in synchronism with extending movement of pushbar 44 in response to extending operation of linkage 56 of pushbar actuator 48. More specifically, shaft 274 has a lever arm or cam 312 which is affixed to and rotatable therewith and which is engageable with the rear end of separator member 58 as cam 312 rotates clockwise (FIG. 25). However, a releasable latch bar 314 is provided to maintain separator member 58 in extended position against the bias and spring 311 after lever arm 312 and shaft 274 are rotated counterclockwise to return pushbar 44 to retracted position. Latch bar 314 is pivotably connected at its rear end to plate 286 by a pivot pin 316 and is biased downwardly into latched position by a compression spring 318 disposed between the latch bar 314 and top plate 222. Initially, a sloped cam surface 322 on the underside of latch bar 314 rests on top of the ends of pin 310 which is in retracted position. When separator member 58 is extended, latch bar 314 assumes its latched position (FIG. 25) wherein detents 320 at the front end of latch bar 314 engage the ends of projecting pin 310 on separator member 58 and prevent its retraction under the force of spring 311 until the latch bar 314 is moved upwardly to disengage pin 310 from the latch bar detents 320. Latch bar 314 is moved upwardly to its release position shown in FIG. 28 when pushbar actuator 46 next moves pushbar 44 to extended position. As this occurs, bar 263 in linkage 56 engages and rides along a sloped cam surface 322 on the underside of the front end of latch bar 314 and causes the latter to pivot upward against the downward bias of spring 318. When linkage 56 again moves pushbar 42 to retracted position, bar 263 also retracts and disengages from cam surface 322 and allows the latch bar 314 to resume its initial position wherein cam surface 322 rests on hhe projecting ends of pin 310.

As previously explained, wire insertion mechanism 14 has two modes of operation. One mode provides a wire segment such as WS having a length slightly longer than the spacing between conveyor assemblies 72 of the two conveyor units 10A and 10B. Both actuators 46 and 48 operate simultaneously to sever wire segment WS and simultaneously force both ends thereof into their respective conveyor units 10A and 10B.

The other mode (FIGS. 19-21) provides a wire segment WS2 (FIG. 21) having a length substantially greater than the spacing between the two conveyor units 10A and 10B. When the free end of a selected wire strand reaches the outboard end of wire guide 38 of wire insertion mechanism 14 and is past the infeed end of outboard conveyor unit 10B, wire feed stops and outboard actuator 48 operates (FIG. 19) to extend outboard pushbar 44 and force the free end of the wire strand into the infeed end of outboard conveyor 10B and to extend separator member 58. The separator member 58 is maintained in extended position, as hereinbefore described, to separate a portion of the blades 50 and 52 while pushbar 44 retracts and while wire feed device 22 is again operated (FIG. 20) to feed a downwardly depending loop L of the selected wire strand between the conveyor units 10A and 10B, whereupon (FIG. 21) wire feed again stops and inboard actuator 46 is operated to sever the wire segment, to force its severed end into the infeed end of inboard conveyor unit 10A and to effect retraction of separator member 58.

In both modes of operation, the conveyor units 10A and 10B are stopped and inoperative while a wire strand or a severed wire segment WS is being forced thereinto.

Wire Cutter Mechanism

FIGS. 1, 2, 5, 15 and 18 through 21 show that wire cutter mechanism 16 is located between wire selector/feed mechanism 12 and wire insertion mechanism 14 and is rigidly mounted on the side of front plate 225 of mechanism 14 by two mounting screws 406.

Referring to FIGS. 29 through 32, wire cutter mechanism 16 comprises a stationary housing 60 and a wire guide assembly 402 mounted thereon.

Figure 32:
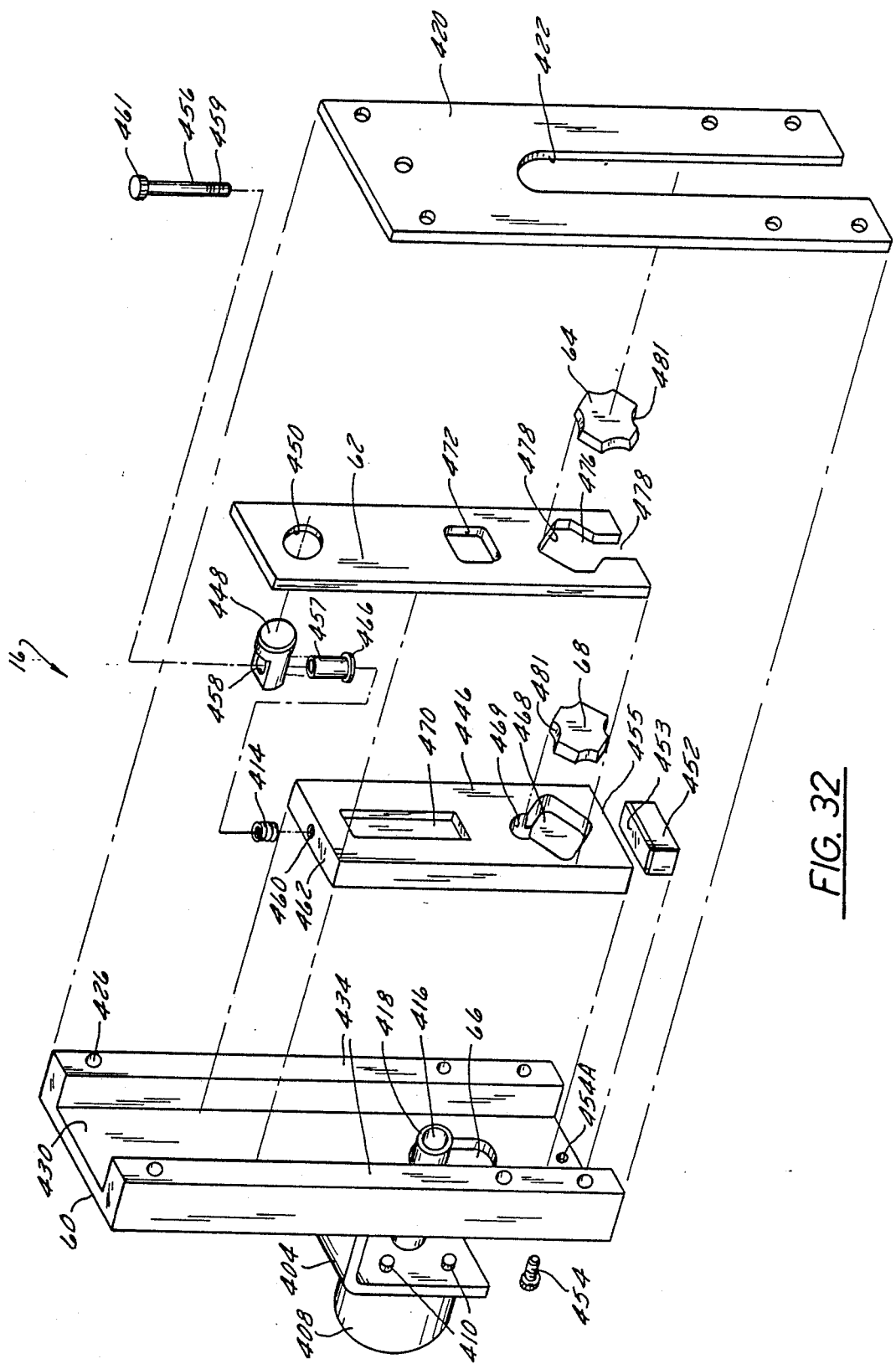
FIG. 32 is an exploded perspective view of the cutter mechanism of FIG. 29.

Housing 60 comprises an inner side plate 420 and an outer side plate 430 which are secured together by screws 454 which extend through holes 426 in the side plates. Outer side plate 430 comprises two integrally formed laterally spaced apart spacer bars 434 which maintain the side plates 420 and 430 in spaced apart relationship and define a space in which the cutter blade holders 62 and 446 are slidably mounted for reciprocable movement. Outer side plate 430 has an elongated hole 432 therethrough which affords access to cutter blade holder 446, as hereinafter explained. The holders 62 and 446 have generally rectangular (square) recesses 476 and 468, respectively, therein which support the cutter blades 64 and 68, respectively. The blades 64 and 68 are identical and each comprises four identical alternately usable sharp cutting edges, such as edge 481 which is shown in FIG. 32 in cutting orientation or position.

Inner side plate 420 of housing 60 comprises an elongated slot 422, open at one end, through which projection 42a (FIG. 18) on reciprocably movable pushbar 42 extends. Slot 422 also accommodates wire strand S1 and, being open at one end, enables the wire segment W1 cut from the strand to be moved clear of housing 60.

Blade holder 62, which lies adjacent to inner side plate 420, is slidably and reciprocably movable horizontally relative thereto by projection 42a which is closely engaged in a rectangular opening 474 in blade holder 62. Blade holder 62 (and its blade 64) is movable between a fully retracted position (FIG. 30) and a fully extended position (FIG. 31) in synchronism with pushbar 42. Blade holder 62 comprises a slot 478, open at one end and communicating at its other end with blade recess 476. Slot 478, like slot 422 above-described, accommodates wire strand S1, and being open, enables the wire segment W1 cut from the strand to be moved clear of housing 60.

The other blade holder 446, which lies adjacent to and between blade holder 62 and outer side plate 430, is slidably and reciprocably movable horizontally relative to holder 62 and plate 430. However, although blade holder 446 moves in the same direction as blade holder 62, it moves through a much shorter distance when moving between its fully retracted position (FIG. 30) and fully extended position (FIG. 31). Blade holder 446 has a recess 470 therein to afford clearance for projection 42a, if necessary.

Means are provided to effect and control such movement of blade holder 446 and comprise five components, namely, a stud 448, a cap screw 456, a hollow sleeve 457, a compression spring 464, and a stop member 452. Stud 448 is entrapped in a hole 450 through the rear end of blade holder 446 and is movable therewith. Stud 448 has a transverse hole 458 therethrough in which hollow sleeve 457 is slidably mounted. Hollow sleeve 457 has a flange 466 at one end. Cap screw 456 extends through hollow sleeve 457 and has a head 461 at one end and threads 459 at its other end which engage a threaded hole 460 in the rear edge 462 of blade holder 446. Helical compression spring 464 is disposed around the shank of cap screw 456 and is located between the rear edge 462 of blade holder 446 and the flange 466 of hollow sleeve 457. Stop member 452, which has a resilient pad 453 mounted thereon by gluing, is rigidly secured in the forward end of the space in housing 60 by a screw 454 which extends through a hole 454A in outer side plate 430 of housing 60. Pad 453 is engageable with the front edge 455 of blade holder 446 as the latter moves forward.

Figure 30:
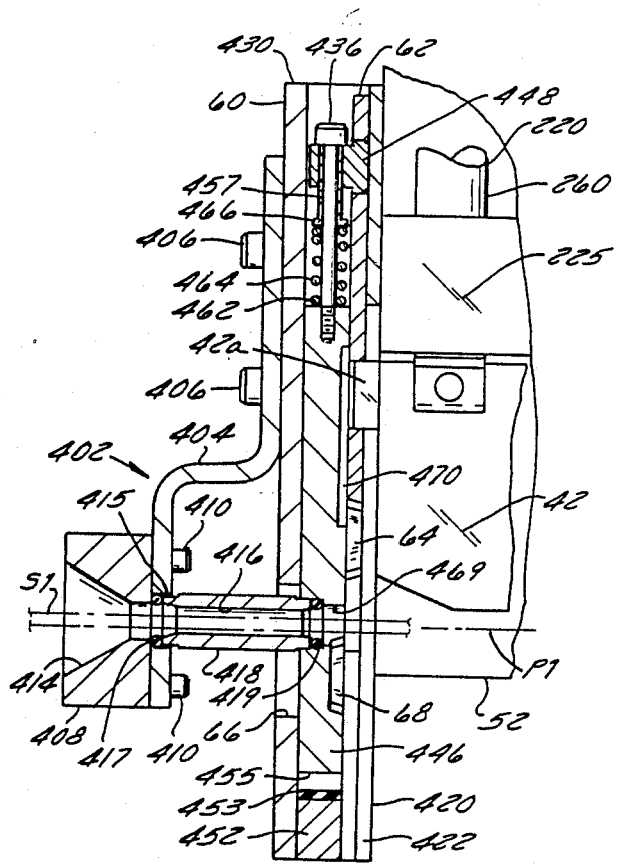
FIGS. 30 and 31 are cross-section views of the cutter mechanism taken on line 30—30 of FIG. 2 and showing it in various stages of operation.
Figure 31:
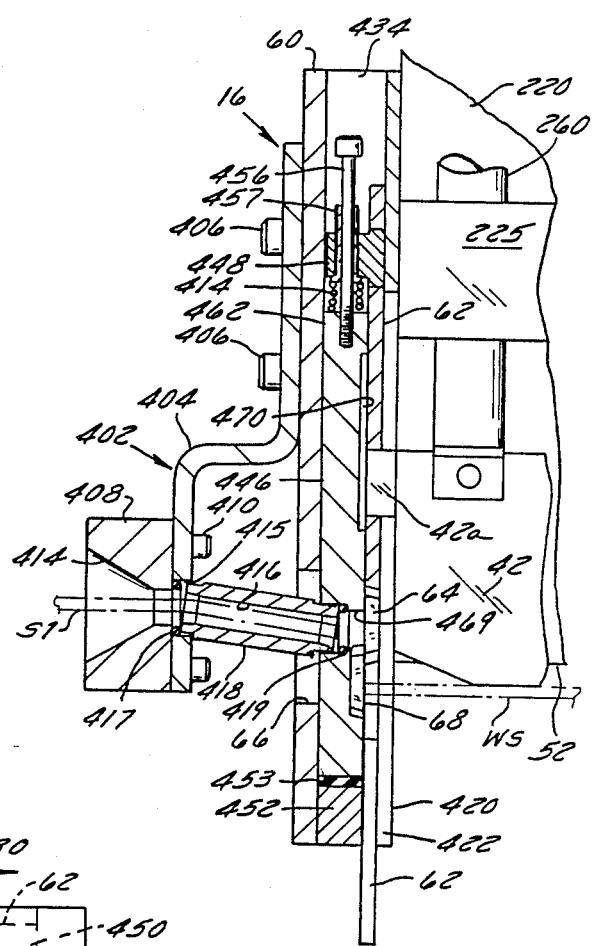
Figure 29:
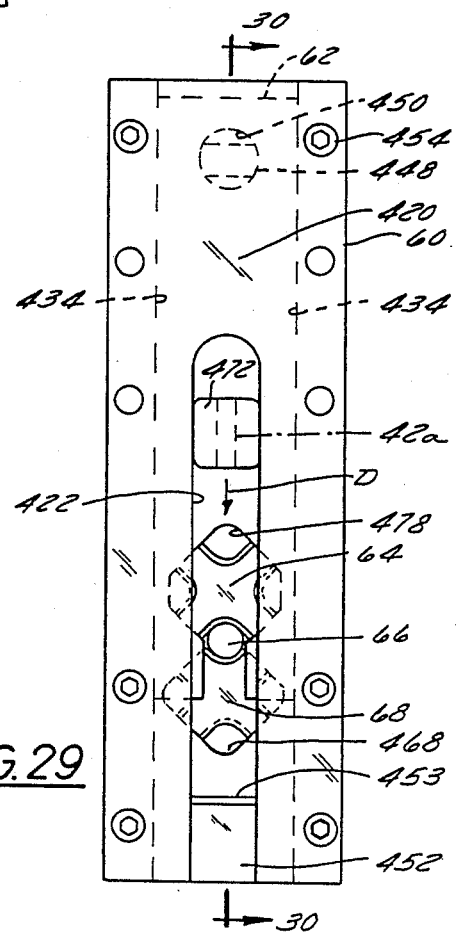
FIG. 29 is an enlarged side elevation view of the cutter mechanism shown in FIGS. 1, 2, 5, 15 and 18-21.

In operation, as comparison of FIGS. 30 and 31 show, when cutter blade holder 62 is moved from its retracted to extended position by projection 42a on pushbar 42, stud 448 moves forward with blade holder 62, engages flange 466 on hollow sleeve 457 and effects compression of spring 464. When spring 464 is compressed to a certain point, it forces cutter blade holder 446 from its retracted position to its fully extended position wherein its front edge 455 engages pad 453 of stop member 452 to prevent further forward movement of blade holder 446. Thus, blade holder 446 commences its forward movement later than and travels a shorter distance than blade holder 62.

Referring to FIGS. 30, 31 and 32, wire guide assembly 402 comprises a stationary support bracket 404, a stationary wire guide device 408 and a movable wire guide tube 418. Bracket 404 is rigidly secured to housing 60 by mounting screws 406. Wire guide device 408, which has a funnel-shaped hole 414 therethrough, is rigidly secured to bracket 404 by mounting screws 410 and its funnel-shaped hole 414 registers with a small hole 415 in bracket 404. Wire guide tube 418, which has a bore 416 therethrough, is mounted by entrapment between bracket 404 and cutter blade holder 446 in such a manner that it can tilt forward as blade holder 446 moves from its retracted to its extended position. Thus, one end of the tube 418 bears against an O-ring 417 located in hole 415 in bracket 404. The other end of tube 418 bears against an O-ring 419 located in a hole 469 in blade holder 446.

Each cutting blade 64 and 68 is constructed in the same way and they are interchangeable. Each blade 64, 68 has four cutting edges 481, but only one edge is used at any given time. As an edge of blade 64, for example, becomes dull, mechanism 16 is detached from support plate 225, the plate 420 is removed from housing 60, the blade 64 is removed from hole 476, rotated to present a fresh cutting edge to a wire strand, replaced in hole 476, plate 420 is reattached, and mechanism 16 is reattached to support plate 225. Cutting blade 68 is reorientated in a similar manner, but blade holder 62 must be removed to afford access to blade 68 in blade holder 446.

In operation of cutter mechanism 16, assume that a wire strand such as S1 already extends along path P1 through wire guide device 408, wire guide tube 418, through hole 469 in blade holder 446, through slot 478 in blade holder 62 and through slot 422 in housing 60. Further assume that pushbar 42 is retracted and that projection 42a thereon, which engages hole 474 in blade holder 62, holds blade holder 62 in its retracted (rearmost) position. Blade holder 446 is also in its retracted position. As pushbar 42 moves toward its fully extended position, it effects corresponding movement of blade holder 62 and the blade 64 thereon. Blade holder 62 effects movement of blade holder 446 toward its fully extended position. As the edge of hole 469 in blade holder 446 engages wire strand S1 it forces the wire strand slightly forward of path P1 (compare FIGS. 30 and 31). Blade holder 446 is brought to a stop when its edge 455 engages stop member 452, but blade holder 62 continues to advance toward its fully extended position and slidably moves relative to blade holder 446. As the cutting edge 481 of cutter blade 64 on blade holder 62 moves past the cutting edge 481 of cutter blade 68 on blade holder 446, the wire strand S1 is severed to provide wire segment WS. After wire segment WS is severed, pushbar 42 and blade holder 62 advance to their fully extended positions (FIG. 31). The wire segment WS severed from wire strand S1 is then advanced by pushbar 42 into the conveyor assembly 72 of conveyor unit 10A. Subsequent retraction of pushbar 42 effects corresponding retraction of blade holder 62 and blade holder 446 is moved back to its retracted position when stud 448 engages head 461 of screw 456. Mechanism 16 is then ready to receive another strand of wire which is fed through wire guide assembly 402 and through cutting mechanism 16. The purpose for causing blade holder 446 to move wire strand S1 forward of path P1 prior to severance is to take into account the fact that pushbar member 42 engages and moves were strand S1 forward of path P1 before the wire segment WS is severed therefrom and the wire strand S1 would be bent at the point of severance by a substantial amount, unless two smaller bends (see FIG. 31) were provided instead.

We claim:
1. Wire processing apparatus comprising:
   a wire selector/feed mechanism (12) comprising a wire selector device and a wire feed device, said wire selector device comprising a pair of spaced apart rotatable plates for releasably supporting a plurality of wire strands and means for rotating said plates to present a selected one of said strands to said wire feed device which is located between said plates and which operates to advance the selected strand along a first path;
   a wire insertion mechanism (14) comprising a wire guide having a passage co-axial with said first path for receiving said selected strand and further comprising two extendable/retractable pushbars operable by two separately operable pushbar actuators for laterally expelling a wire from said passage;
   a cutter mechanism (16) between said wire selector/feed mechanism (12) and said wire insertion mechanism (14) and operable by one of said pushbars to cut a wire segment from said strand;
   and a conveyor mechanism (10) for receiving and conveying a wire segment laterally expelled from said passage along a second path transverse to said first path with said wire segment disposed transverse to said second path,
   said conveyor mechanism comprising a pair of laterally spaced apart conveyor units, each unit having a support and a flexible belt type conveyor assembly mounted on said support and into which an end of a wire segment is inserted by a pushbar, said conveyor mechanism further comprising means to adjustably position a flexible belt type conveyor assembly relative to its respective support.

2. A wire selector/feed mechanism (12) for supporting and selecting one of a plurality of wire strands and feeding it along a path comprising:
   a support;
   a wire selector device comprising a pair of plates rotatably mounted on said support and spaced apart from one another in the direction of said path, said plates being disposed and rotatable transversely to said path,
   each plate having a plurality of circumferentially spaced apart wire-receiving holes therethrough,
   each set of aligned holes in said pair of plates being adapted to receive and releasably support a strand of wire;
   said plates being selectively rotatable simultaneously about an axis parallel to said path to positions wherein each set of holes is aligned with said path;
   and a wire feed device mounted on said support and comprising a pair of separable rotatable wire feed members movably mouned on said support between said pair of plates and disposed on opposite sides of said path,
   said wire feed members, when separated, being capable of receiving a wire strand moved therebetween by said plates as said plates are rotated,
   said wire feed members, when closed and rotated, being capable of gripping and moving a wire strand entrapped therebetween through its respective set of holes in said plates and along said path.

3. A wire selector/feed mechanism (12) according to claim 2 wherein said wire selector device further includes:
   releasable wire entrapment means on one of said plates for releasably maintaining each wire strand in its associated set of holes in said plates;
   and means on said support selectively operable to release said releasable wire entrapment means after its associated wire strand is gripped by said wire feed members.

4. A wire insertion mechanism (14) for inserting a wire laterally into the infeed end of a conveyor comprising:
 a support;
 a wire guide mounted on said support and having a passage for accommodating a wire inserted thereinto;
 a pushbar mounted on said support for laterally moving wire from said passage and into said infeed end of said conveyor,
 said pushbar being movable during one complete cycle of operation from a retracted position behind said passage, laterally through said passage to an extended position and back to said retracted position, said pushbar being operable when moving from retracted to extended position to laterally move a wire from said passage and into said infeed end of said conveyor;
 actuator means on said support and having an actuator member which is linearly movable along a path during one stroke from a retracted position to an extended position and which is linearly movable along said path during a return stroke from said extended position to said retracted position;
 and linkage means operatively connected between said actuator member and said pushbar to cause either said one stroke or said return stroke of said actuator member to effect one complete cycle of operation of said pushbar.

5. A wire insertion mechanism (14) according to claim 4 wherein said linkage means comprises at least one link which is movable in a direction transverse to said path;
 means for pivotally connecting one end of said one link to said actuator member;
 and means for pivotally connecting the other end of said one link to said pushbar.

6. A wire insertion mechanism (14) according to claim 5 wherein said linkage means comprises a second link;
 means for pivotally connecting one end of said second link to said one end of said one link;
 means for pivotally and slidably connecting said one end of said one link and said one end of said second link to said actuator member;
 and means for pivotally connecting the other end of said second link to said support.

7. A wire insertion mechanism (14) according to claim 4 or 5 or 6 including adjustment means for repositioning said actuator member and said linkage means to adjust the position of said pushbar relative to said passage to enable said passage to accommodate wires of different diameters in said passage.

8. A wire insertion mechanism (14) according to claim 4 or 5 or 6 wherein said wire guide comprises a pair of flexible blades which define said passage and which are separable to accommodate lateral expulsion of a wire being moved laterally from said passage by said pushbar and into said infeed end of said conveyor.

9. A wire insertion mechanism (14) for inserting a wire into the infeed ends of a pair of laterally spaced apart conveyor assemblies, said wire insertion mechanism comprising:
 a support;
 a wire guide on said support and having a passage for accommodating a wire inserted thereinto;
 a pair of pushbars for laterally moving wire from said passage and into said infeed ends of said conveyor assemblies,
 each pushbars being movable during one complete cycle of operation from a retracted position behind said passage, laterally through said passage to an extended position and back to said retracted position, each pushbar being operable when moving from retracted to extended position to move that portion of a wire closest thereto from said passage and into the infeed end of its associated conveyor assembly;
 two independently operable pushbar actuators on said support, one for each pushbar, each pushbar actuator having an actuator member which is linearly movable along a path during one stroke from a retracted position to an extended position and which is linearly movable along said path during a return stroke from said extended position to said retracted position;
 and separate linkage means for each actuator, each linkage means being operatively connected between a respective actuator member and its associated pushbar to cause either said one stroke or said return stroke of a respective actuator member to effect one complete cycle of operation of its associated pushbar.

10. A wire insertion mechanism (14) according to claim 9 wherein said wire guide comprises a pair of flexible blades which define said passage and which are separable to accommodate lateral expulsion of a wire being moved laterally from said passage by a pushbar into the infeed end of an associated conveyor assembly;
 and wherein said wire insertion mechanism further includes an extendable/retractable separator member mounted on said support between said pair of pushbar components,
 said separator member being movable from its retracted position to its extended position to effect separation of a portion of said blades in response to operation of one of said pushbar actuators in moving its associated pushbar to extended position;
 and a releasable latch device operable when in latched position to maintain said separator member in extended position when said associated pushbar returns to its retracted position,
 said latch device being movable to released position to allow said separator member to return to its retracted position in response to operation of the other of said pushbar actuators in moving its associated pushbar to extended position.

11. A conveyor mechanism (10) including at least one conveyor unit (10A) for receiving a wire segment from a wire insertion mechanism (14) and for transporting it along a path of conveyance with said wire segment being disposed transversely to said path of conveyance, said conveyor mechanism comprising:
 a support structure;
 a conveyor assembly including an elongated framework extending in the direction of said path and having opposite sides, said framework having wire gripping means mounted thereon which are movable in the direction of said path of conveyance, said wire gripping means being adapted to grip a wire segment being conveyed so that an end portinn thereof projects from a side of said framework;
 mounting means for mounting said conveyor assembly on said support structure to enable adjustable movement of said conveyor assembly relative to said support structure and relative to said wire insertion mechanism (14) in directions transverse to said path of conveyance to selected positions to thereby determine the length of said end portion of said wire segment projecting from said side of said framework, said mounting means being rigidly connected to said framework and movably connected to said support structure;

selectively operable positioning means connected between said mounting means and said support structure and operable to effect movement of said conveyor assembly to said selected positions;

and releasable locking means connected between said support structure and said mounting means for releasably locking said conveyor assembly in a selected position.

12. A conveyor mechanism (10) according to claim 11:

wherein said mounting means comprises a support bracket which is rigidly secured to said elongated framework and further comprises means for slidably connecting said support bracket to said support structure;

wherein said positioning means comprises a rotatable screw connected between said support bracket and said support structure;

and wherein said releasable locking means is connected between said support structure and said support bracket.

13. A wire cutter mechanism (16) operable by a reciprocably movable component for severing a wire and comprising:

a housing having a wire receiving opening extending therethrough for accommodating said wire and having a first slot therein for receiving said reciprocably movable component, said housing being adapted for stationary mounting relative to said reciprocably movable component;

first and second cutter blade holders slidably mounted within said housing;

first and second cutter blades mounted on said first and second cutter blade holders, respectively, each cutter blade having a cutting edge, said second cutter blade holder having a wire receiving hole therethrough which is bounded on one side by the cutting edge of said second cutter blade;

means on said first cutter blade holder engageable with said component whereby reciprocating motion of said component effects reciprocating motion of said first cutter blade holder and the first cutter blade thereon between a retracted and an extended position of predetermined distance;

means connected between said first and second cutter blade holders whereby reciprocating motion of said first cutter blade holder effects reciprocating motion of said second cutter blade holder and the second cutter blade thereon between a retracted and an extended position which is less than said predetermined distance, said second cutter blade holder being operable, when moved from its retracted position to its extended position, to effect lateral shifting movement of a wire extending through said wire receiving hole therethrough from an initial position to a displaced position;

said first cutter blade holder being operable, when moved from its retracted position to its extended position, to effect movement of said first cutter blade thereon toward said second cutter blade whereby the cutting edge of said first cutter blade moves toward and then past the cutting edge of said second cutter blade and severs a wire extending through said wire receiving hole in said second cutter blade holder while said wire is in said displaced position.

14. A wire cutter mechanism (16) according to claim 13 wherein said means connected between said first and second cutter blade holders comprises a stud member rigidly secured to said first cutter blade holder and having a hole therethrough;

a hollow sleeve slidably mounted in said hole in said stud member;

a pin slidably mounted in said hollow sleeve and having a flange at one end and having its other end connected to said second cutter blade holder;

and biasing means disposed between said second cutter blade holder and said sleeve.

15. A wire cutter mechanism (16) according to claim 13 or 14 wherein each of said first and second cutter blades has a plurality of cutting edges and wherein each of said first and second cutter blade holders has attachment means thereon to enable its associated cutter blade to be mounted thereon in any one of a plurality of different orientations.

16. A wire cutter mechanism (16) according to claim 15 wherein said attachment means comprises a hole in the cutter blade holder.

* * * * *